United States Patent
Li et al.

(10) Patent No.: US 10,575,185 B2
(45) Date of Patent: Feb. 25, 2020

(54) SPECTRUM RENTING NEGOTIATION

(71) Applicant: QUALCOMM Incorporated, San Diego, CA (US)

(72) Inventors: Junyi Li, Chester, NJ (US); Aleksandar Damnjanovic, Del Mar, CA (US); Michael Mingxi Fan, San Diego, CA (US); Yongbin Wei, La Jolla, CA (US); Tamer Kadous, San Diego, CA (US); Ahmed Sadek, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/800,363

(22) Filed: Nov. 1, 2017

(65) Prior Publication Data

US 2018/0317093 A1  Nov. 1, 2018

Related U.S. Application Data

(60) Provisional application No. 62/491,031, filed on Apr. 27, 2017.

(51) Int. Cl.
*H04W 74/08* (2009.01)
*H04W 16/14* (2009.01)
*H04W 28/16* (2009.01)

(52) U.S. Cl.
CPC ........... *H04W 16/14* (2013.01); *H04W 28/16* (2013.01); *H04W 74/0875* (2013.01); *H04W 74/0816* (2013.01)

(58) Field of Classification Search
USPC .................. 455/454, 410, 452.1, 509, 552.1; 370/329, 338, 401
See application file for complete search history.

(56) References Cited

U.S. PATENT DOCUMENTS

| | | | |
|---|---|---|---|
| 7,324,491 B1* | 1/2008 | Benveniste | H04L 12/66 370/338 |
| 2002/0163933 A1* | 11/2002 | Benveniste | H04L 47/10 370/465 |
| 2006/0274704 A1* | 12/2006 | Desai | H04W 72/1215 370/338 |

(Continued)

OTHER PUBLICATIONS

International Search Report and Written Opinion—PCT/US2018/024678—ISA/EPO—dated Jun. 13, 2018.

*Primary Examiner* — Nathan S Taylor
(74) *Attorney, Agent, or Firm* — Haynes and Boone, LLP

(57) ABSTRACT

Wireless communication systems and methods related to spectrum use negotiations are provided. A first wireless communication device transmits, to a controlling entity of a spectrum, a spectrum use request for a local operator to use the spectrum for a time period. The first wireless communication device receives, from the controlling entity, a spectrum use grant indicating that the local operator is promoted from a first priority to a second priority for accessing the spectrum during the time period. The first wireless communication device communicates with a second wireless communication device in the spectrum during the time period based on the second priority, where at least the first wireless communication device or the second wireless communication device is associated with the local operator.

40 Claims, 14 Drawing Sheets

(56) References Cited

U.S. PATENT DOCUMENTS

| | | | |
|---|---|---|---|
| 2009/0257379 A1* | 10/2009 | Robinson | H04W 16/14 370/329 |
| 2010/0223659 A1 | 9/2010 | Ekl et al. | |
| 2011/0080882 A1* | 4/2011 | Shu | H04W 28/26 370/329 |
| 2013/0324174 A1* | 12/2013 | Mueck | H04W 16/14 455/509 |
| 2015/0050939 A1* | 2/2015 | Futaki | H04W 24/08 455/452.1 |
| 2016/0066192 A1* | 3/2016 | Markwart | H04W 16/14 455/410 |
| 2016/0119899 A1 | 4/2016 | Freda et al. | |
| 2018/0192295 A1* | 7/2018 | Mueck | H04W 16/14 |
| 2018/0213563 A1* | 7/2018 | Yang | H04W 74/0808 |
| 2018/0242165 A1* | 8/2018 | MacMullan | H04W 16/14 |
| 2018/0359685 A1* | 12/2018 | Li | H04W 72/0453 |
| 2019/0013909 A1* | 1/2019 | Li | H04L 5/0048 |
| 2019/0014596 A1* | 1/2019 | Yang | H04W 72/0446 |
| 2019/0141748 A1* | 5/2019 | Li | H04W 24/10 |

\* cited by examiner

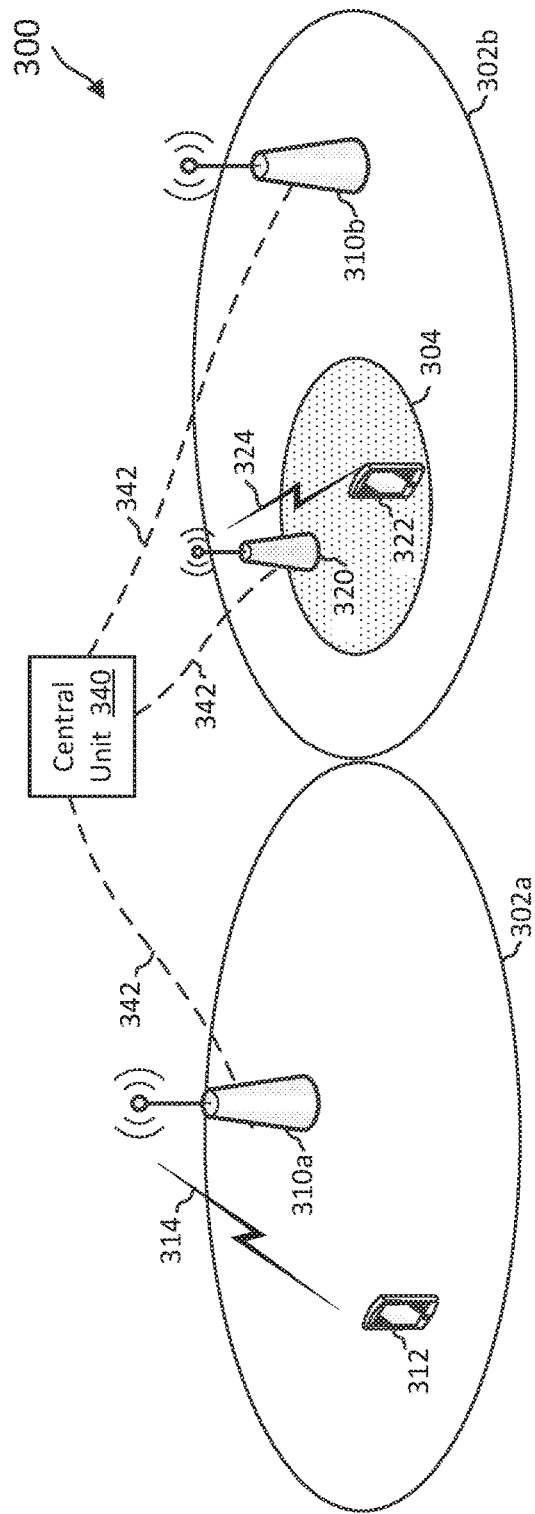
FIG. 3
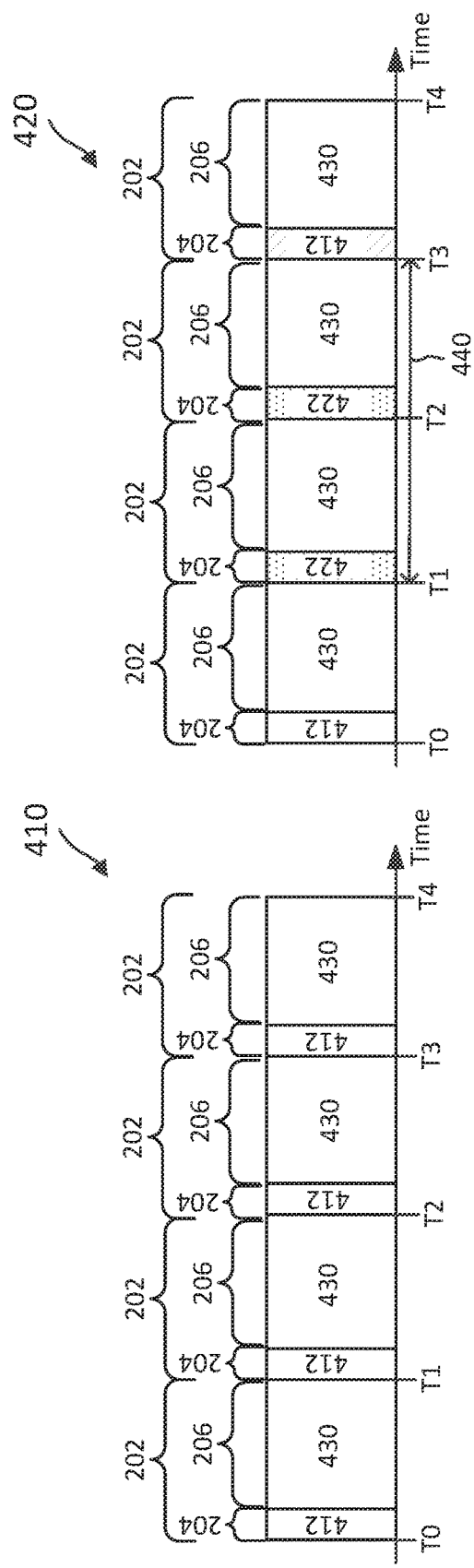
FIG. 4A
FIG. 4B

SPECTRUM RENTING NEGOTIATION

CROSS REFERENCE TO RELATED APPLICATIONS

The present application claims priority to and the benefit of the U.S. Provisional Patent Application No. 62/491,031, filed Apr. 27, 2017, which is hereby incorporated by reference in its entirety as if fully set forth below and for all applicable purposes.

TECHNICAL FIELD

This application relates to wireless communication systems, and more particularly to dynamic spectrum use negotiations.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations (BSs), each simultaneously supporting communication for multiple communication devices, which may be otherwise known as user equipment (UE).

A wireless communications system may operate over a shared spectrum, meaning that the wireless communications system includes one or more frequency bands that may be shared by multiple network operating entities. In some instances, multiple network operating entities may share their licensed spectrum with each other or with other third-party operators to better utilize the spectrum.

One approach to sharing a medium or a spectrum is to employ a priority-based coordinated access scheme. In the priority-based coordinated access scheme, a shared spectrum is partitioned into multiple time periods. At any time period, one operator may be a primary user and have priority to access the spectrum while other operators may opportunistically access the spectrum when the spectrum is available. In some instances, the operators may take turn to become a primary user, for example, in a round-robin manner Spectrum pooling is an example resource sharing strategy where an operator is a primary user in a spectrum owned or licensed by the operator and may opportunistically access a spectrum of another operator.

Some local operating entities or third-parties may not own any spectrum. For example, a local operating entity, such as local stores or local businesses, may provide wireless services, such as Institute of Electrical and Electronics Engineers (IEEE) 801.11 (WiFi) services, to users over an unlicensed spectrum. The unlicensed spectrum may be shared by multiple operating entities serving corresponding users. As the number of users on the unlicensed spectrum increases, the unlicensed spectrum can become congested. Thus, the local operating entity may not be able to provide guaranteed services and can only provide best-effort services over the unlicensed spectrum.

In some instances, a licensed spectrum in a geographical location of the local operating entity may have idle or unoccupied resources. The spectrum owner of the licensed spectrum may allow the local operating entity to opportunistically share the licensed spectrum, for example, as a secondary user while the spectrum owner is a primary user. The local operating entity may provide better service quality by having additional resources from the sharing of the licensed spectrum. However, as a secondary user, the quality may be dependent on the network traffic condition of the spectrum owner.

In some instances, the local operating entity may share a shared spectrum, for example, at about 3.5 gigahertz (GHz) or at about 37 GHz, with the assistance or coordination with a protected access license (PAL) and/or general authorized access (GAA) operating entities. However, the local operating entity may not have guaranteed access to the shared spectrum. Thus, the local operating entity still may not be able to provide guaranteed services.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes transmitting, by a first wireless communication device to a controlling entity of a spectrum, a spectrum use request for a local operator to use the spectrum for a time period; and receiving, by the first wireless communication device from the controlling entity, a spectrum use grant indicating that the local operator is promoted from a first priority to a second priority for accessing the spectrum during the time period.

In an additional aspect of the disclosure, a method of wireless communication includes receiving, by a controlling entity of a spectrum, a spectrum use request for a local operator to use the spectrum for a time period; and transmitting, by the controlling entity, a spectrum use grant indicating that the local operator is promoted from a first priority to a second priority for accessing the spectrum during the time period.

In an additional aspect of the disclosure, a method of wireless communication includes receiving, by a first wireless communication device from a second wireless communication device, a measurement signal in a spectrum; transmitting, by the first wireless communication device to a controlling entity of the spectrum, a signal measurement report based on the measurement signal; and receiving, by the first wireless communication device from the controlling entity, an instruction indicating that a local operator has priority over another operator for accessing the spectrum in a time period based on at least the signal measurement report.

In an additional aspect of the disclosure, an apparatus includes a transceiver configured to transmit, to a controlling entity of a spectrum, a spectrum use request for a local operator to use the spectrum for a time period; and receive, from the controlling entity, a spectrum use grant indicating that the local operator is promoted from a first priority to a second priority for accessing the spectrum during the time period.

In an additional aspect of the disclosure, an apparatus includes a transceiver configured to receive a spectrum use request for a local operator to use a spectrum for a time period; and transmit a spectrum use grant indicating that the local operator is promoted from a first priority to a second priority for accessing the spectrum during the time period.

In an additional aspect of the disclosure, an apparatus includes a transceiver configured to receive, from a second wireless communication device, a measurement signal in a spectrum; transmit, to a controlling entity of the spectrum, a signal measurement report based on the measurement signal; and receive, from the controlling entity, an instruction indicating that a local operator has priority over another operator for accessing the spectrum in a time period based on at least the signal measurement report.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 3 illustrates a wireless communication network that implements spectrum renting according to embodiments of the present disclosure.

FIG. 4A illustrates a spectrum usage scenario according to embodiments of the present disclosure.

FIG. 4B illustrates a spectrum usage scenario with a spectrum rental according to embodiments of the present disclosure.

DETAILED DESCRIPTION

Figure 1:
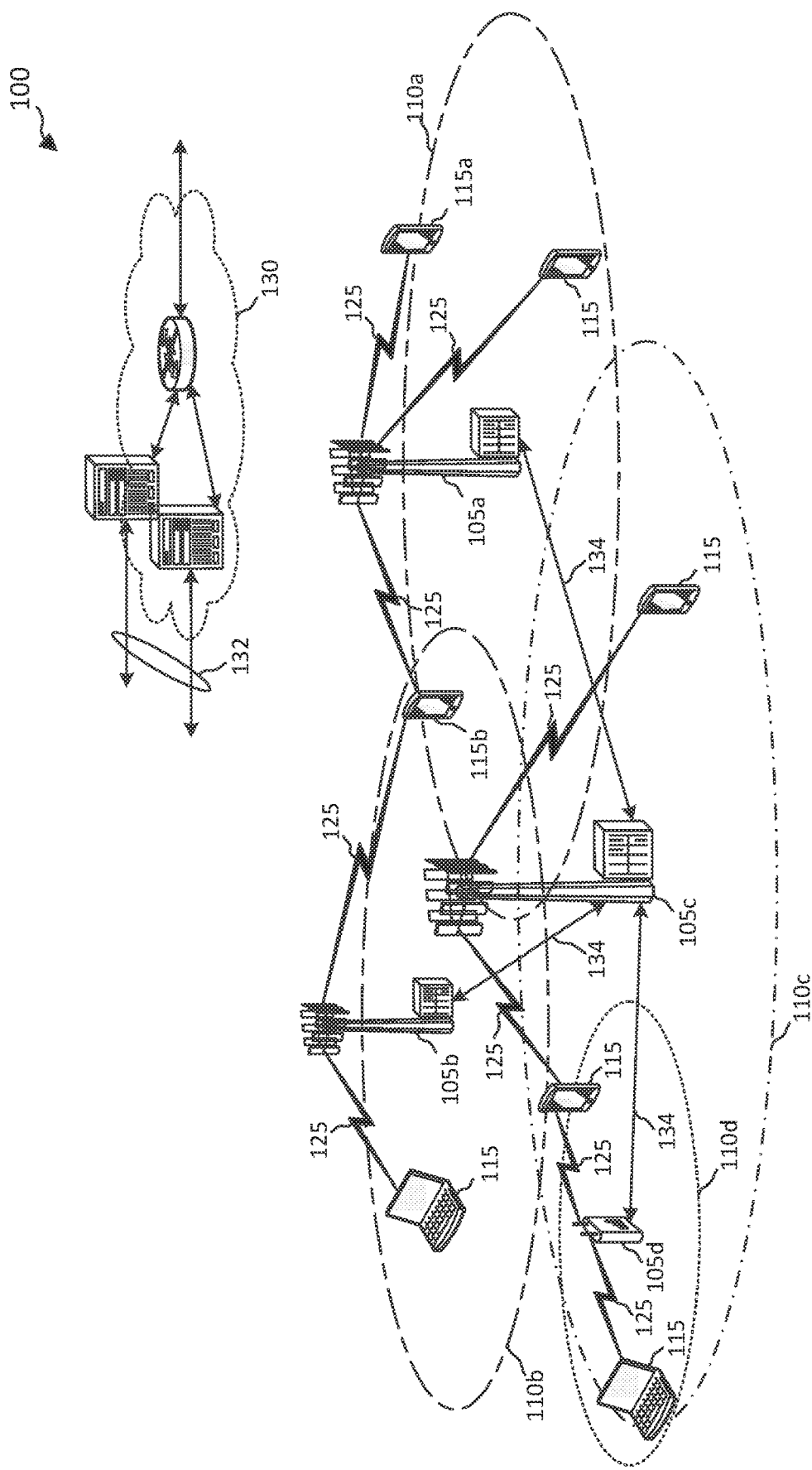
FIG. 1 illustrates a wireless communication network according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G) operating in mmWave bands) network.

The present application describes mechanisms for a local operating entity to dynamically requests spectrum use from one or more spectrum controlling entities in a local geographic area of the local operating entity. A controlling entity of a spectrum is typically a primary user of the spectrum. The request is for a temporary use of the spectrum as a primary user. An example of spectrum use is spectrum rental. Examples of a spectrum controlling entity may include an owner of a spectrum, an exclusive licensee of a spectrum, and a non-exclusive licensed primary operator of a spectrum. The disclosed embodiments are described in the context of negotiating a spectrum rental from an owner of the spectrum, but may be applied to negotiating temporary use of a spectrum from a controlling entity of the spectrum.

In an embodiment, a local operating entity may be a local business or a local store providing wireless access services to users. The local operating entity may have access points (APs) and/or other wireless communication equipment. The local operating entity may not own any spectrum. The local operating entity may operate over an unlicensed spectrum and dynamically request a spectrum rental from a spectrum owner in real-time based on communication requirements. In an embodiment, a UE may initiate a connection with the local operating entity via the unlicensed spectrum. The local operating entity may negotiate a spectrum rental with an owner of a spectrum in the local geographic area. After receiving a spectrum rental grant from the spectrum owner, the local operating entity may communicate with the UE over the rented spectrum. The spectrum rental is limited to a certain time period (e.g., a communication session with the UE) and a certain local geographic area where the local operating entity and the UE are located. The relationship between the local operating entity and the UE may be transactional or transient (e.g., communication session-based).

In an embodiment, the local operating entity may negotiate a spectrum rental with a central spectrum allocation authority (e.g., a spectrum owner server). The spectrum owner server may instruct the local operating entity and the UE to transmit measurement signals. The spectrum owner server may instruct spectrum owner nodes to measure measurement signals received from the local operating entity and the UE. The spectrum owner server may grant or deny the spectrum rental request depending on the measurements received from spectrum owner nodes, the time period for the rental, expected traffic condition of the spectrum owner network in the area, and/or expected traffic condition of the local operating network.

Aspects of the present disclosure can provide several benefits. For example, the temporary spectrum renting or use can leverage the access infrastructure and/or equipment of local operating entities to provide high-quality, premium services to users. As an example, a local operating entity may reach a subset of UEs. The subset of UEs may be at a closer distance to a BS or AP of the local operating entity than to BSs of corresponding operators that operate the UEs. By allowing the local operating entity to access a spectrum owner's spectrum as a primary user, the local operating entity can provide high-quality, premium services to the UEs. In addition, the temporary spectrum renting allow the local operating entity to rent or use as needed instead of paying a fixed cost to be a primary user in a fractional portion of a spectrum at all time. The spectrum renting allows the local operating entity to be a primary user of an entire spectrum for a duration of time. Thus, the local operating entity can provide guaranteed services instead of best-effort services at a substantially low cost. Further, multiple local operating entities may operate over overlapping areas and multiple spectrum owners may have spectrums in the overlapping areas. Thus, a spectrum owner may offer spectrum rentals to multiple local operating entities and multiple spectrum owners may bid to offer spectrum rentals to a local operating entity. As such, the disclosed embodiments provide flexible mechanisms for using and/or renting a spectrum based on communication session requirements.

FIG. 1 illustrates a wireless communication network 100 according to embodiments of the present disclosure. The network 100 includes BSs 105, UEs 115, and a core network 130. In some embodiments, the network 100 operates over a shared spectrum. The shared spectrum may be unlicensed or partially licensed to one or more network operators. Access to the spectrum may be limited and may be controlled by a separate coordination entity. In some embodiments, the network 100 may be a LTE or LTE-A network. In yet other embodiments, the network 100 may be a millimeter wave (mmW) network, a new radio (NR) network, a 5G network, or any other successor network to LTE. The network 100 may be operated by more than one network operator. Wireless resources may be partitioned and arbitrated among the different network operators for coordinated communication between the network operators over the network 100.

The BSs 105 may wirelessly communicate with the UEs 115 via one or more BS antennas. Each BS 105 may provide communication coverage for a respective geographic coverage area 110. In 3GPP, the term "cell" can refer to this particular geographic coverage area of a BS and/or a BS subsystem serving the coverage area, depending on the context in which the term is used. In this regard, a BS 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS. In the example shown in FIG. 1, the BSs 105a, 105b and 105c are examples of macro BSs for the coverage areas 110a, 110b and 110c, respectively. The BSs 105d is an example of a pico BS or a femto BS for the coverage area 110d. As will be recognized, a BS 105 may support one or multiple (e.g., two, three, four, and the like) cells.

Communication links 125 shown in the network 100 may include uplink (UL) transmissions from a UE 115 to a BS 105, or downlink (DL) transmissions, from a BS 105 to a UE 115. The UEs 115 may be dispersed throughout the network 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

The BSs 105 may communicate with the core network 130 and with one another. The core network 130 may provide user authentication, access authorization, tracking, Internet Protocol (IP) connectivity, and other access, routing, or mobility functions. At least some of the BSs 105 (e.g., which may be an example of an evolved NodeB (eNB), a next generation NodeB (gNB), or an access node controller (ANC)) may interface with the core network 130 through backhaul links 132 (e.g., S1, S2, etc.) and may perform radio configuration and scheduling for communication with the UEs 115. In various examples, the BSs 105 may communicate, either directly or indirectly (e.g., through core network 130), with each other over backhaul links 134 (e.g., X1, X2, etc.), which may be wired or wireless communication links.

Each BS 105 may also communicate with a number of UEs 115 through a number of other BSs 105, where the BS 105 may be an example of a smart radio head. In alternative configurations, various functions of each BS 105 may be distributed across various BSs 105 (e.g., radio heads and access network controllers) or consolidated into a single BS 105.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into subbands.

In an embodiment, the BSs 105 can assign or schedule transmission resources (e.g., in the form of time-frequency resource blocks) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit cell-specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication tha UL communication. A UL-centric subframe may include a longer duration for UL communication tha UL communication.

In an embodiment, a UE 115 attempting to access the network 100 may perform an initial cell search by detecting a primary synchronization signal (PSS) from a BS 105. The PSS may enable synchronization of period timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively. After receiving the PSS and SSS, the UE 115 may receive a master information block (MIB), which may be transmitted in the physical broadcast channel (PBCH). The MIB may contain system bandwidth information, a system frame number (SFN), and a Physical Hybrid-ARQ Indicator Channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource configuration (RRC) configuration information related to random access channel (RACH) procedures, paging, physical uplink control channel (PUCCH), physical uplink shared channel (PUSCH), power control, SRS, and cell barring. After obtaining the MIB and/or the SIBs, the UE 115 can perform random access procedures to establish a connection with the BS 105. After establishing the connection, the UE 115 and the BS 105 can enter a normal operation stage, where operational data may be exchanged.

In some embodiments, the UEs 115 and the BSs 105 may be operated by multiple network operators or network operating entities and may operate in a shared radio frequency spectrum, which may include licensed or unlicensed frequency bands. The shared spectrum may be time-partitioned for sharing among the multiple network operating entities to facilitate coordinated communication. For example, in the network 100, the BS 105a and the UE 115a may be associated with one network operating entity, while the BS 105b and the UE 115b may be associated with another network operating entity. By time-partitioning the shared spectrum according to network operating entities, the communications between the BS 105a and the UE 115a and the communications between the BS 105b and the UE 115b may each occur during respective time periods and may avail themselves of an entirety of a designated shared spectrum.

To support coordinated access of the shared spectrum, a BS 105 or an entity of the core network 130 may act as a central arbitrator to manage access and coordinate the partitioning of resources among different network operating entities operating within the network 100. In some embodiments, the central arbitrator may include a spectrum access system (SAS). In addition, the transmissions from the multiple network operating entities can be time synchronized to facilitate the coordination.

Figure 2:
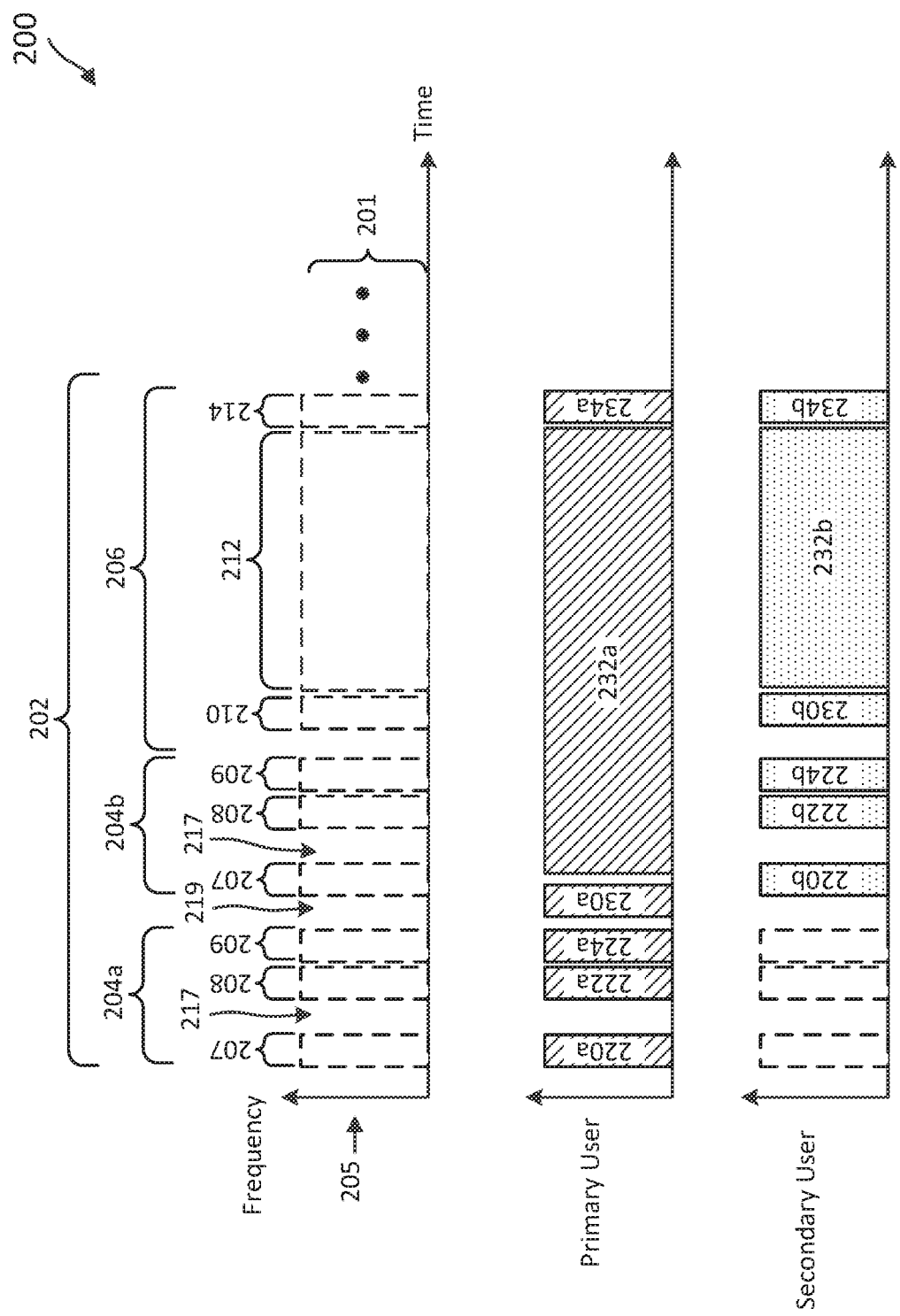
FIG. 2 illustrates a coordinated priority-based medium sharing scheme with interference management according to embodiments of the present disclosure.

FIG. 2 illustrates a coordinated priority-based spectrum sharing scheme 200 with interference management according to embodiments of the present disclosure. The x-axes represent time in some constant units. The y-axes represent frequency in some constant units. The scheme 200 may be employed by the BSs 105 and the UEs 115 to access a shared spectrum 201. While the scheme 200 illustrates coordinated spectrum access for two different network operating entities (e.g., a primary user and a secondary user), the scheme 200 can be applied to any suitable number of network operating entities, including three, four, or more operating entities.

In the scheme 200, the spectrum 201 is time-partitioned into a plurality of transmit opportunities (TXOPs) 202 as shown in the frame structure 205. The TXOPs 202 may have a fixed duration and may be defined in units of OFDM symbols, subframes, slots, and/or any suitable time format. In some embodiments, the TXOP 202 may have a duration of about 10 milliseconds (ms) to about 40 ms. Each TXOP 202 includes a plurality of channel sensing or clear channel assessment (CCA) periods 204 followed by a transmission period 206. The CCA periods 204 are separated by a gap period 219. The frame structure 205 of the TXOP 202 is predetermined and known by all network operating entities sharing the spectrum 201. The network operating entities may be time-synchronized when operating in the shared spectrum 201.

Each CCA period 204 is assigned to a particular network operating entity. For example, the CCA period 204a is assigned to the primary user and the CCA period 204b is assigned to the secondary user. The assigned network operating entity may transmit a reservation in the CCA period 204 to reserve the following transmission period 206. Each CCA period 204 includes portions 207, 208, and 209. The portions 207 and 208 are separated by a gap period 217. The portions 207 are used for transmitting reservation request (RRQ) signals 220. Each RRQ signal 220 may include a predetermined preamble sequence, a request-to-send (RTS) signal, and/or transmission triggers (e.g., scheduling information). The portions 208 are used for transmitting reservation response (RRS) signals 222 for operator-level sharing (e.g., across operators). The portions 209 are used for transmitting RRS signals 224 for link-level sharing (e.g., between UL and DL) within an operator. Each of the RRS signals 222 and 224 may include a predetermined preamble sequence or a clear-to-send (CTS) signal. The CCA periods 204 can be arranged in a decreasing order of priorities. Thus, a low-priority operator node can monitor the channel (e.g., the shared spectrum 201) in the CCA periods 204 of higher priorities. Upon detection of a reservation from a high-priority operator node, the low-priority operator node may refrain from transmitting in the following transmission period 206. The gap period 219 allows low-priority operator nodes to process the reservation of a higher priority operator. The gap period 217 allows for switching between UL and DL processing.

The transmission period 206 include a DL control portion 210, a data portion 212, and a UL control portion 214. The DL control portion 210 is used for transmitting DL controls 230 (e.g., UL or DL triggers) for the data portion 212 and/or the UL control portion 214. The data portion 212 is used for transmitting UL or DL data 232 based on corresponding triggers. The UL control portion 216 is used for transmitting UL controls 234, such as scheduling request (SR) and hybrid automatic repeat request (HARQ) information.

The pattern-filled boxes shown with respect to the primary user and the secondary user in FIG. 2 represent signal transmissions. The dashed-outline boxes at the top of FIG. 2 are included as references to the TXOP structure 205 without signal transmission.

For operator-level sharing, a BS of a primary user may transmit an RRQ signal 220a in the portion 207 of the CCA period 204a to reserve the following transmission period 206. The RRQ signal 220a may include a trigger for a primary UE. A target receiver corresponding to the trigger may transmit an RRS signal 222a in the portion 208 of the CCA period 204a to silence lower-priority operators (e.g., the secondary user). When the trigger is a DL trigger, the UE is the target receiver. Conversely, when the trigger is a UL trigger, the BS is the target receiver. Subsequently, the primary BS may communicate a DL control 230a, data 232a, and a UL control 234a with the triggered UE in the following transmission period 206.

Secondary user nodes may monitor the CCA period 204a for an RRQ signal 220a and/or an RRS signal 222a from the primary user. Upon detection of an RRQ signal 220a and/or an RRS signal 222a from the primary user, the secondary user nodes may yield spectrum access to the primary user. However, when the shared spectrum 201 is not reserved by the primary user, the secondary user can opportunistically access the transmission period 206 of the TXOP 202 using similar mechanisms as the primary user.

For link-level sharing within the primary user or the secondary user, the primary user or the secondary user may use substantially similar reservation mechanisms as the operator-level sharing. As an example, the link priority is DL within the primary user. A primary DL-granting BS may transmit an RRQ signal 220a in the portion 207 of the CCA period 204a to trigger a UE for a DL communication. Similarly, a primary UL-granting BS may transmit an RRQ signal 220a in the same portion 207 to trigger a UE for a UL communication, for example, based on reuse one. The DL-triggered UE (e.g., the target receiver) may transmit an RRS signal 224a in the portion 209 of the CCA period 204a to silence primary user nodes of the lower link priority (e.g., UL). Subsequently, the DL-granting BS may exchange a DL control 230a, data 232a, and a UL control 234a with the DL-triggered UE in the transmission period 206.

The UL-triggered UE may monitor the portion 209 for an RRS signal 224a. Upon detection of an RRS signal 224a signal, the UL-triggered UE may yield spectrum access to the DL communication. However, when the shared spectrum 201 is not reserved for DL communication, the UL-triggered UE may dynamically switch the link priority from DL to UL and communicate a DL control 230a, data 232a, and a UL control 234a with the UL-granting BS.

FIGS. 3, 4A, and 4B illustrate a spectrum renting scenario, where a local operator rents a spectrum from a spectrum owner for a communication session in a local geographic area of the local operator. An example of a communication session may be a movie streaming session. A communication session may span a number of TXOPs 202. Spectrum renting can leverage the scheme 200. For example, during a spectrum rental session, the local operator (e.g., the tenant) may function as a primary user of the spectrum and the spectrum owner may function as a secondary user of the spectrum. Thus, spectrum renting allows the local operator to provide guaranteed or premium services. FIG. 3 illustrates a wireless communication network 300 that implements spectrum renting according to embodiments of the present disclosure. FIG. 4A illustrates a spectrum usage scenario 410 according to embodiments of the present disclosure. FIG. 4B illustrates a spectrum usage scenario 420 with a spectrum rental according to embodiments of the present disclosure.

The network 300 may be similar to the network 100. FIG. 3 illustrates three BSs (e.g., BSs 310 and 320) and two UEs (e.g., UEs 312 and 322) for purposes of simplicity of discussion, though it will be recognized that embodiments of the present disclosure may scale to many more UEs and/or BSs. The BSs 310 and 320 are similar to the BSs 105. The UEs 312 and 322 are similar to the UEs 115. As an example, a spectrum owner owns the spectrum 201 across geographic areas 302a and 302b. The spectrum owner operates the BSs 310 and the UE 312. The spectrum owner BS 310a and the UE 312 are in communication with each other via a link 314 (e.g., the links 125) over the spectrum 201 in the geographic area 302a. The spectrum owner BS 310b is located in a geographic area 302b. A local operator (e.g., a local business) operates the BS 320 in a geographic area 304 within the geographic area 302b. The UE 322 is located in the geographic area 304. The UE 322 may be operated by any operator, for example, the spectrum owner or another operator.

In the network 300, the spectrum owner may share the spectrum 201 with the local operator. The spectrum owner may access the spectrum 201 as a primary user while the local operator may share the spectrum 201 as a secondary user using a similar sharing mechanisms as in the scheme 200 described with respect to FIG. 2. As an example, the local operator BS 320 rents the spectrum 201 in the geographic area 304 for a communication session to serve the UE 322. As shown, the local operator BS 320 and the UE 322 are in communication via a link 324 over the spectrum 201.

In an embodiment, the local operator BS 320 may be a wireless access point (AP) and the UE 322 may begin communication over an unlicensed spectrum (e.g., a WiFi spectrum). However, the unlicensed spectrum may be overcrowded, and thus the local operator BS 320 may not be able to provide the service quality requested by the UE 322. In some instances, the local operator BS 320 may also share the spectrum 201 as a secondary user to improve the service quality. To further guarantee the requested service quality, the local operator BS 320 may rent the spectrum 201 for a time period or a communication session from the spectrum owner. The renting promotes the local operator BS 320 and the UE 322 to primary users of the spectrum 201 in the geographic area 304. The renting is dynamically initiated based on a communication request, for example, from the UE 322. The renting is for a duration of time including a number of TXOPs 202. The local operator BS 320 may communicate with the UE 322 using any suitable wireless communication technology that may coexist with the spectrum owner's radio access technology. Since the spectrum owner BS 310b is close to the geographic area 304, the renting may downgrade or demote the spectrum owner to a secondary user in the geographic area 302b. Since the BS 310a and the UE 312 are in a different geographic area 302a, the BS 310a and the UE 312 may remain as the primary user.

In an embodiment, the UE 322 may be operated by the spectrum owner. However, the UE 322 may be located farther away from the spectrum owner BSs 310 than from the local operator BS 320. Thus, the UE 322 may gain a better service quality from the local operator BS 320 than from the spectrum owner BSs 310. As such, the UE 322 may request the service from the local operator BS 320 instead.

In an embodiment, the local operator BS 320 may negotiate the spectrum rental with a central unit 340 or server of the spectrum owner via backhaul links 342 (e.g., the backhaul links 132). The central unit 340 may be a server of the spectrum owner or a server of a controlling entity of the spectrum 201. The central unit 340 may include hardware and/or software components configured to instruct the local operator BS 320 and the UE 322 requesting the rental to transmit measurement signals for interference management. The central unit 340 may instruct the spectrum owner BSs 310 and UE 312 to measure the measurement signals. The measurement signals may include reservation signals, RRSs, SRSs, and CSI-RSs, and/or any suitable reference signals. The central unit 340 may determine the amount of interference from the local operator BS 320 and the UE 322 to the spectrum owner BSs 310 and UE 312 based on the measurements. The central unit 340 may determine whether to grant the rental based on the expected interference and/or other information, such as the expected network traffic load in the spectrum owner network within the geographic area 304. In some other embodiments, a spectrum owner BS 310 may act as a central unit. In such embodiments, the local operator BS 320 and/or the UE 322 may negotiate with the spectrum owner BS 310 over a wireless link. The mechanisms for negotiating and/or granting the rental are described in greater detail herein.

The scenario 410 illustrates the spectrum usage in the geographic area 302a during a time T0 to a time T4. The scenario 420 illustrates the spectrum usage in the geographic area 302b during the same time period from the time T0 to the time T4. As an example, the local operator BS 320 rents the spectrum 201 for a rental time period 440 between a time T1 and a time T3. The rental time period 440 includes two TXOPs 202. In some other embodiments, the rental time period 440 can include any suitable number of TXOPs 202, such as ten, twenty-five, fifty, or a hundred. For example, each TXOP 202 may include a duration of about 10 ms to about 40 ms and the rental time period 440 may include a duration of about one second, a few seconds, or a few minutes.

In the scenario 410, the spectrum owner remains as the primary user from the time T1 to the time T4 (e.g., including the rental time period 440) in the geographic area 302a. The spectrum owner BS 310a and the spectrum owner UE 312 communicate signaling 412 of the spectrum owner during the CCA periods 204 and data 430 during the transmission periods 206.

In the scenario 420, the local operator is promoted to be a primary user in the rental time period 440 in the geographic area 304. The local operator BS 320 and the UE 322 communicate signaling 422 of the local operator and data 430 in the time period 440. The spectrum owner is demoted to be a secondary user in the rental time period 440 in the geographic area 302b. Thus, the local operator BS 320 has guaranteed access to the spectrum 201 during the time period 440, where the spectrum owner BS 310b may yield spectrum access to the local operator BS 320 and opportunistically share the spectrum 201 when not in use by the local operator BS 320. The spectrum owner BS 310b may revert to be a primary user after the rental time period 440 has ended (e.g., after the time T3).

Figure 5:
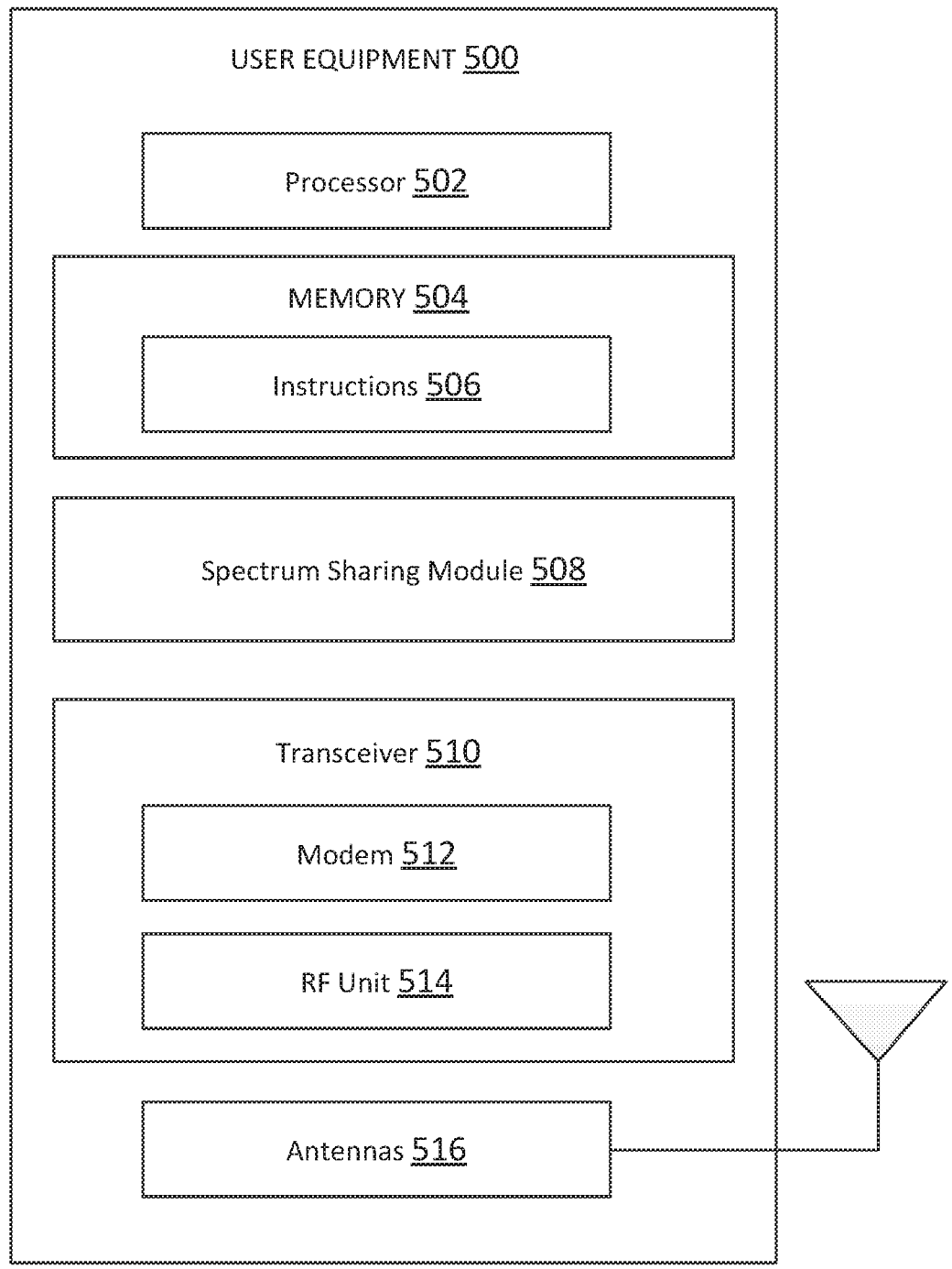
FIG. 5 is a block diagram of an exemplary user equipment (UE) according to embodiments of the present disclosure.

FIG. 5 is a block diagram of an exemplary UE 500 according to embodiments of the present disclosure. The UE 500 may be a UE 115 or 315 as discussed above. As shown, the UE 500 may include a processor 502, a memory 504, a spectrum sharing module 508, a transceiver 510 including a modem subsystem 512 and a radio frequency (RF) unit 514, and one or more antennas 516. These elements may be in direct or indirect communication with each other, for example via one or more buses.

The processor 502 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 504 includes a non-transitory computer-readable medium. The memory 504 may store instructions 506. The instructions 506 may include instructions that, when executed by the processor 502, cause the processor 502 to perform the operations described herein with reference to the UEs 115 in connection with embodiments of the present disclosure. Instructions 506 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The spectrum sharing module 508 may be used for various aspects of the present disclosure. For example, the spectrum sharing module 508 is configured to transmit measurement signals to facilitate spectrum renting, identify TXOPs in a shared spectrum or rented spectrum, perform network listening, as described in greater detail herein. In some instances, the spectrum sharing module 508 is configured to initiate and/or negotiate a spectrum rental by coordinating with a local operator BS depending on the embodiments, as described in greater detail herein. In some instances, the spectrum sharing module 508 is configured to measure signals and to generate signal measurement reports to facilitate spectrum renting depending on the embodiments, as described in greater detail herein.

As shown, the transceiver 510 may include the modem subsystem 512 and the RF unit 514. The transceiver 510 can be configured to communicate bi-directionally with other devices, such as the BSs 105 and 305. The modem subsystem 512 may be configured to modulate and/or encode the data from the memory 504 and/or the spectrum sharing module 508 according to a modulation and coding scheme (MCS), e.g., a low-density parity check (LDPC) coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 312 and 322 or a BS 310 and 320. The RF unit 514 may be further configured to perform analog beamforming in conjunction with the digital beamforming. Although shown as integrated together in transceiver 510, the modem subsystem 512 and the RF unit 514 may be separate devices that are coupled together at the UE 115 to enable the UE 115 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of RRS signals CSI-RSs, and/or SRSs according to embodiments of the present disclosure. The antennas 516 may further receive data messages transmitted from other devices. The antennas 516 may provide the received data messages for processing and/or demodulation at the transceiver 510. The antennas 516 may include multiple antennas of similar or different designs in order to sustain multiple transmission links. The RF unit 514 may configure the antennas 516.

Figure 6:
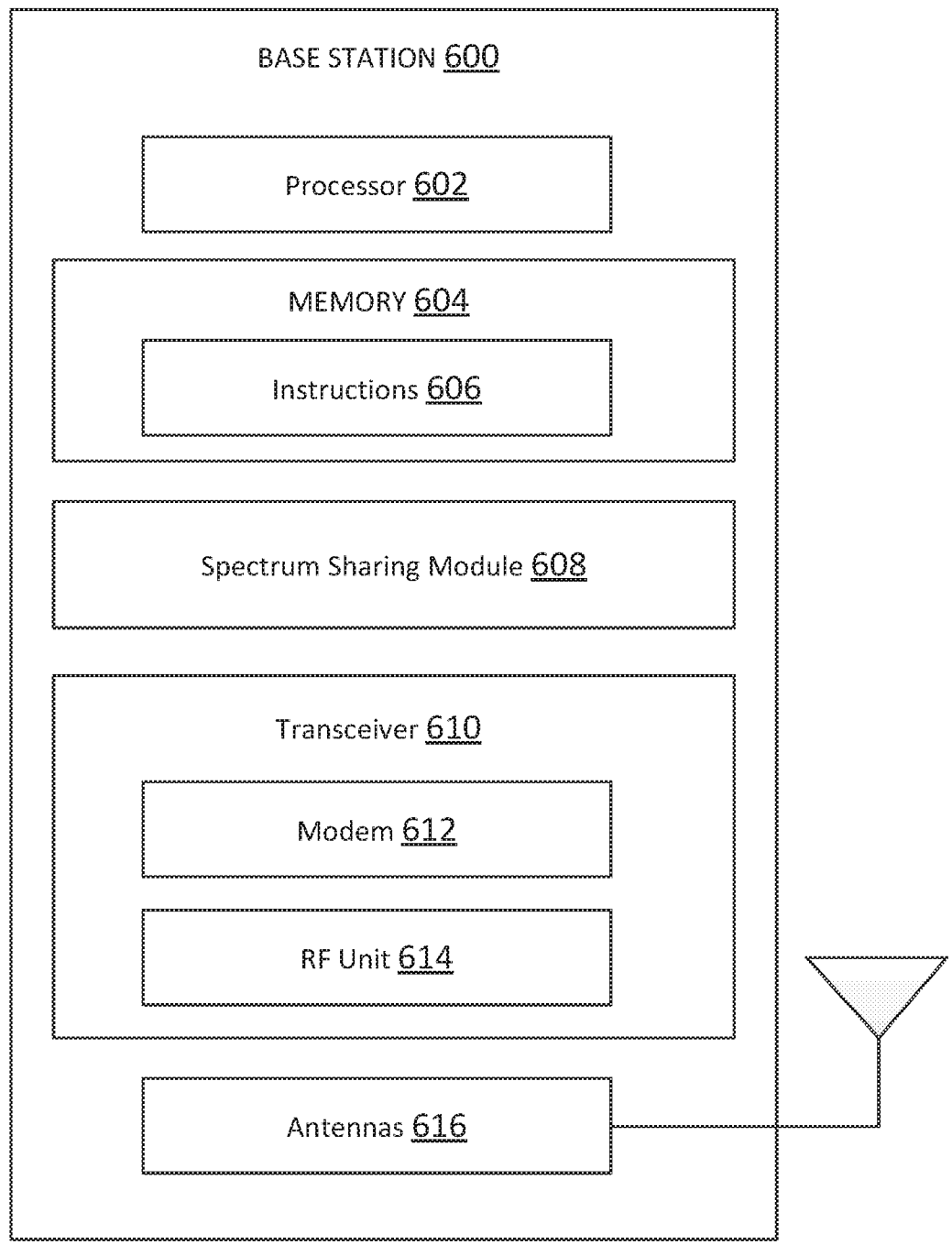
FIG. 6 is a block diagram of an exemplary base station (BS) according to embodiments of the present disclosure.

FIG. 6 is a block diagram of an exemplary BS 600 according to embodiments of the present disclosure. The BS 600 may be a BS 105 or 305 as discussed above. A shown, the BS 600 may include a processor 602, a memory 604, a spectrum sharing module 608, a transceiver 610 including a modem subsystem 612 and a RF unit 614, and one or more antennas 616. These elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 604 may include a non-transitory computer-readable medium. The memory 604 may store instructions 606. The instructions 606 may include instructions that, when executed by the processor 602, cause the processor 602 to perform operations described herein. Instructions 606 may also be referred to as code, which may be interpreted broadly to include any type of computer-readable statement(s) as discussed above with respect to FIG. 6.

The spectrum sharing module 608 may be used for various aspects of the present disclosure. For example, the spectrum sharing module 608 is configured to negotiate spectrum rentals with spectrum owners, identify TXOPs in a shared spectrum or rented spectrum, and perform network listening, as described in greater detail herein. In some instances, the spectrum sharing module 608 is configured to function as a central unit such as the central unit 340 and determine spectrum allocations for spectrum renting, as described in greater detail herein.

As shown, the transceiver 610 may include the modem subsystem 612 and the RF unit 614. The transceiver 610 can be configured to communicate bi-directionally with other devices, such as the UEs 115 and 215 and/or another core network element. The modem subsystem 612 may be configured to modulate and/or encode data according to a MCS, e.g., a LDPC coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data from the modem subsystem 612 (on outbound transmissions) or of transmissions originating from another source such as a UE 215. The RF unit 614 may be further configured to perform analog beamforming in conjunction with the digital beamforming. Although shown as integrated together in transceiver 610, the modem subsystem 612 and the RF unit 614 may be separate devices that are coupled together at the BS 305 to enable the BS 305 to communicate with other devices.

The RF unit 614 may provide the modulated and/or processed data, e.g. data packets (or, more generally, data messages that may contain one or more data packets and other information), to the antennas 616 for transmission to one or more other devices. This may include, for example, transmission of information to complete attachment to a network and communication with a camped UE 215 according to embodiments of the present disclosure. The antennas 616 may further receive data messages transmitted from other devices and provide the received data messages for processing and/or demodulation at the transceiver 610. The antennas 616 may include multiple antennas of similar or different designs in order to sustain multiple transmission links.

Figure 7:
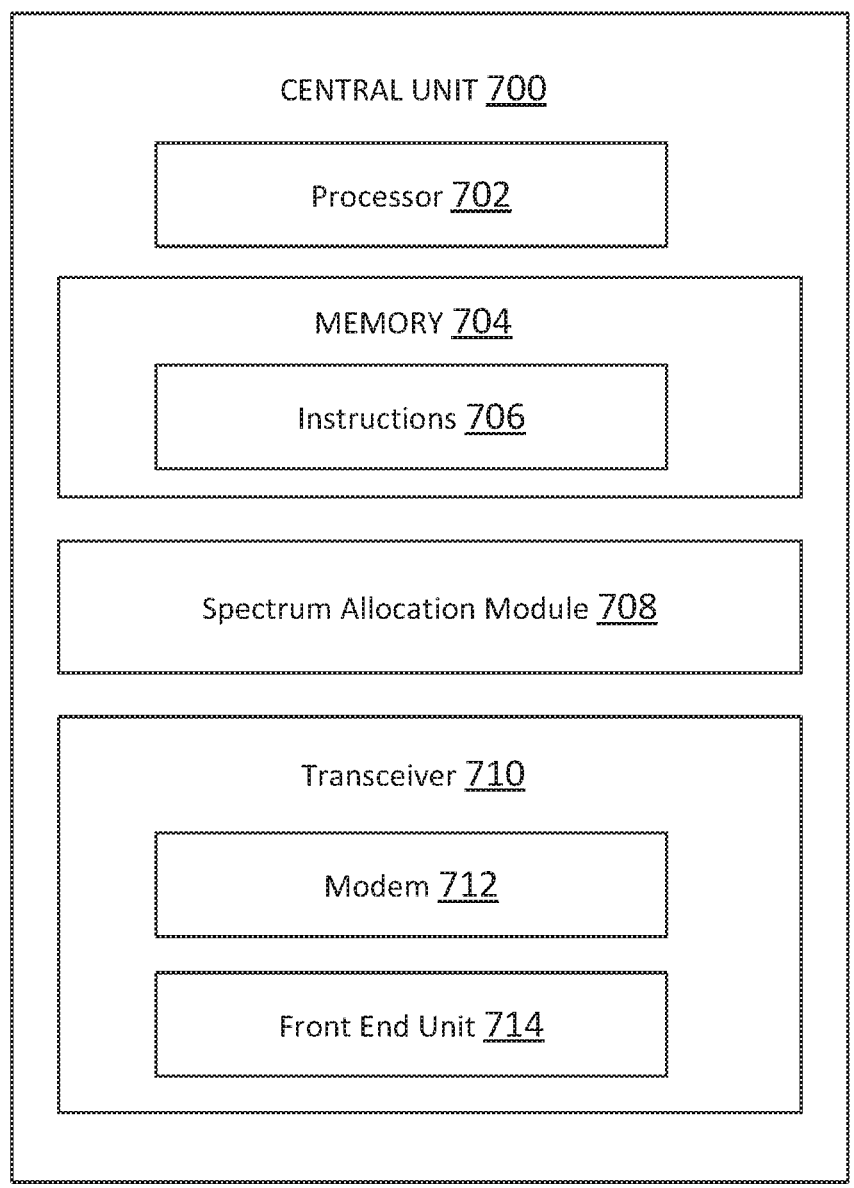
FIG. 7 is a block diagram of an exemplary central unit according to embodiments of the present disclosure.

FIG. 7 illustrates a block diagram of an exemplary central unit 700 according to embodiments of the present disclosure. The central unit 700 may be a spectrum owner server, a central unit 340 or a controlling entity of a spectrum as discussed above. A shown, the central unit 700 may include a processor 702, a memory 704, a spectrum allocation module 708, and a transceiver 710 including a modem subsystem 712 and a frontend unit 714. These elements may be in direct or indirect communication with each other, for example via one or more buses.

The processor 702 may have various features as a specific-type processor. For example, these may include a CPU, a DSP, an ASIC, a controller, a FPGA device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 704 may include a non-transitory computer-readable medium. The memory 704 may store instructions 706. The instructions 706 may include instructions that, when executed by the processor 702, cause the processor 702 to perform operations described herein. Instructions 706 may also be referred to as code, which may be interpreted broadly to include any type of computer-readable statement(s) as discussed above with respect to FIG. 7.

The spectrum allocation module 708 may be used for various aspects of the present disclosure. For example, the spectrum allocation module 708 is configured to receive spectrum rental requests, instruct BSs and/or UEs (e.g., of a tenant) to transmit measurement signals for interference management, instruct BSs and/or UEs (e.g., of a spectrum owner network) to report signal measurements, determine interference impact from a tenant to the spectrum owner, determine a geographic coverage area of a local operator, determine spectrum allocation, and grant or deny spectrum rental requests, as described in greater detail herein.

As shown, the transceiver 710 may include the modem subsystem 712 and the frontend unit 714. The transceiver 710 can be configured to communicate bi-directionally with other devices, such as the BSs 105, 310, and 320 and/or another core network element. The modem subsystem 712 may be configured to modulate and/or encode data according to a MCS, e.g., a LDPC coding scheme, a turbo coding scheme, a convolutional coding scheme, etc. The frontend unit 714 may include electrical-to-optical (E/O) components and/or optical-to-electrical (O/E) components that convert an electrical signal to an optical signal for transmission to a BS such as the BSs 105, 310, and 320 and/or receive an optical signal from the BS and convert the optical signal into an electrical signal, respectively. The frontend unit 714 may be configured to process (e.g., perform analog to digital conversion or digital to analog conversion, optical to electrical conversion or electrical to optical conversion, etc.) modulated/encoded data from the modem subsystem 712 (on outbound transmissions) or of transmissions originating from another source such as a backend or core network. Although shown as integrated together in transceiver 710, the modem subsystem 712 and the frontend unit 714 may be separate devices that are coupled together at the central unit 700 to enable the central unit 700 to communicate with other devices. The frontend unit 714 may transmit optical signal carrying the modulated and/or processed data over an optical link such as the links 342. The frontend unit 714 may further receive optical signals carrying data messages and provide the received data messages for processing and/or demodulation at the transceiver 710.

Figure 8:
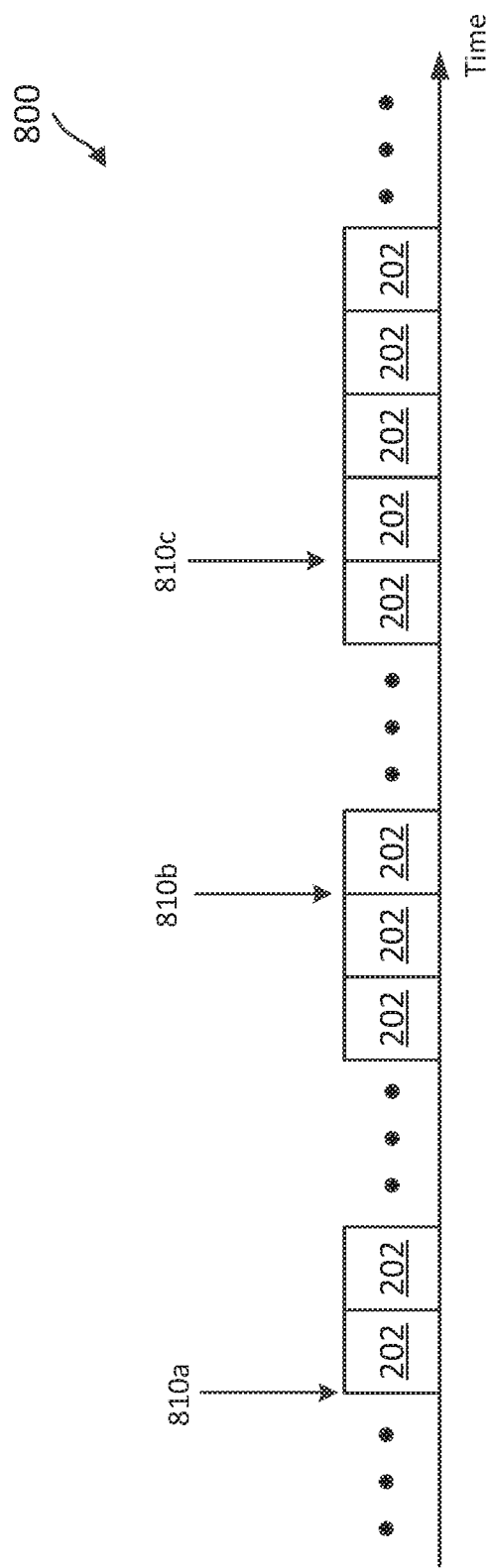
FIG. 8 illustrates a spectrum renting negotiation timing scenario 800 according to embodiments of the present disclosure.

FIG. 8 illustrates a spectrum renting negotiation timing scenario 800 according to embodiments of the present disclosure. The x-axis represents time in some constant units. The scenario 800 may correspond to spectrum renting in the network 300. While spectrum renting may use a substantially similar scheme (e.g., the scheme 200) as spectrum sharing, spectrum renting is different from spectrum sharing. Spectrum renting occurs at a slow time scale, for example, at intervals of a plurality of TXOPs 202. As an example, the local operator BS 320 may negotiate with the spectrum owner at time 810*a*, 810*b*, and 810*c* for spectrum rentals. The time gap between the time 810*a*, 810*b*, and 810*c* may vary based on communication needs. In some instances, the negotiations may be triggered by communication session requests from the UE 322 or another UE in the geographic area 304. In addition, spectrum renting decisions and/or allocations are determined centrally by the spectrum owner, for example, at a spectrum owner server such as the central unit 340 or a spectrum owner BS such as the BSs 310 functioning as a central unit. By contrast, spectrum sharing occurs at a fast time scale, where the decision of sharing occurs at a rate of the TXOPs 202. In addition, the decision for spectrum sharing is distributed over all BSs sharing the spectrum (e.g., the spectrum 201) instead of centralized as in spectrum renting.

Figure 9:
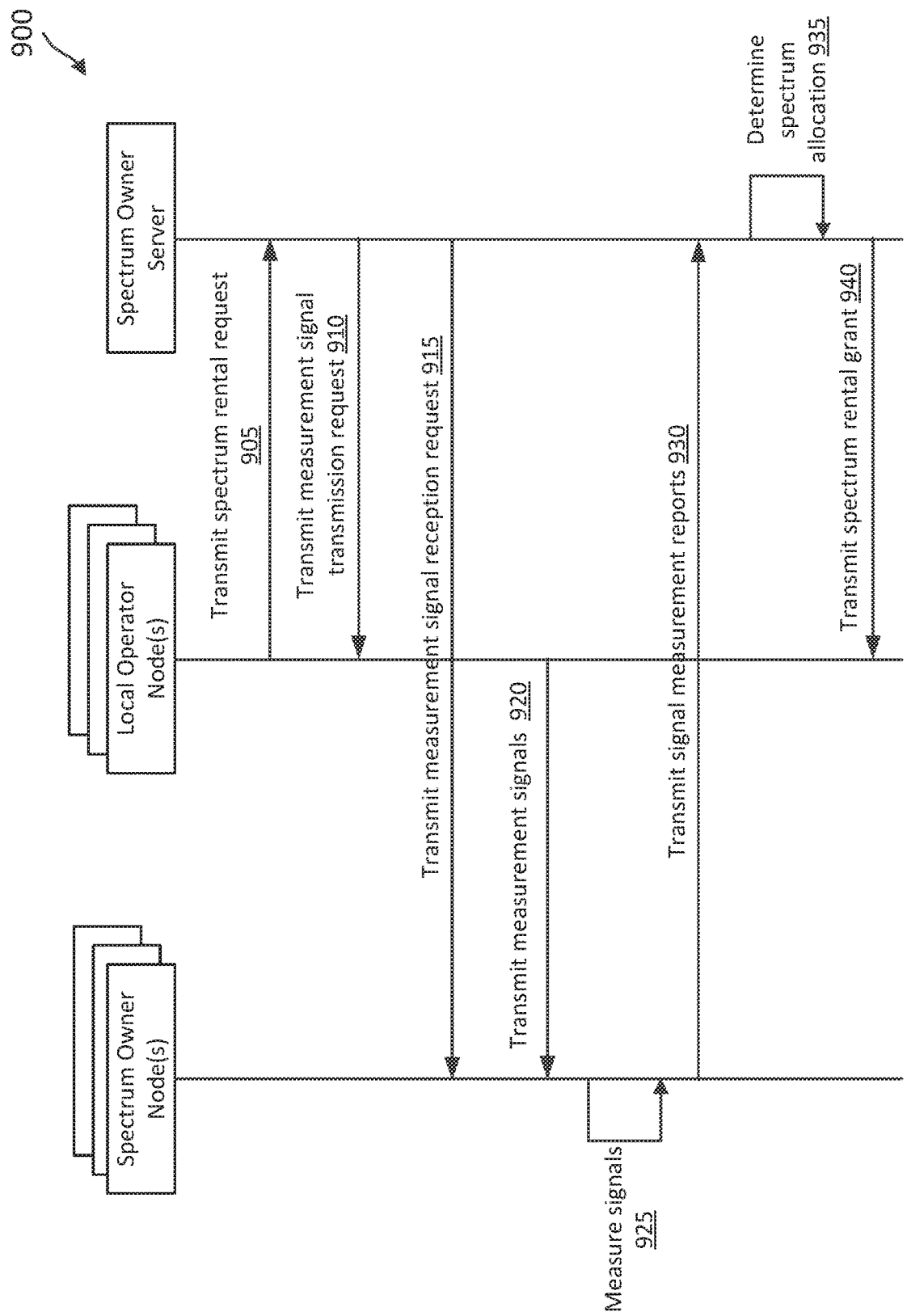
FIG. 9 is a signaling diagram of a spectrum renting negotiation method according to embodiments of the present disclosure.

FIG. 9 is a signaling diagram of a spectrum renting negotiation method according to embodiments of the present disclosure. The method 900 is implemented among a spectrum owner server, spectrum owner nodes, and local operator nodes (e.g., tenant nodes). The spectrum owner nodes and the local operator nodes may be similar to the BSs 105, 310, 320, and 600 and the UEs 115, 312, 322, and 500. The spectrum owner server may be similar to the central units 340 and 700. For instance, in the context of the network 300, the spectrum owner server may correspond to the central unit 340, the spectrum owner nodes may correspond to the BSs 310 and the UE 312, and the local operator nodes may correspond to the BS 320 and the UE 322. Steps of the method 900 can be executed by computing devices (e.g., a processor, processing circuit, and/or other suitable component) of the spectrum owner nodes, the spectrum renter nodes, and the spectrum owner server. The method 900 may employ similar mechanisms as in the scheme 200, the network 300, and the scenario 800 described with respect to FIGS. 2, 3, and 8, respectively. As illustrated, the method 900 includes a number of enumerated steps, but embodiments of the method 900 may include additional steps before, after, and in between the enumerated steps. In some embodiments, one or more of the enumerated steps may be omitted or performed in a different order.

At step 905, a local operator node (e.g., the local operator BS 320) transmits a spectrum rental request to a spectrum owner server, for example, via a backhaul link 132. The request may indicate a rental request for a spectrum (e.g., the spectrum 201) for a certain time period (e.g., the rental time period 440). The request may include a start time (e.g., the time T1) and a stop time (e.g., the time T3) for a communication session. The request is for a geographic coverage area (e.g., the geographic area 304) of the local operator node. The request may indicate the geographic coverage area. The request may be triggered by a service or communication request (e.g., for real-time movie streaming) from a nearby UE (e.g., the UE 322). The request may indicate service quality constraints and/or requirements (e.g., data rate and/or quality of service (QoS)) based on the service request of the UE.

At step 910, upon receiving the request, the spectrum owner server transmits a measurement signal transmission request to the local operator nodes (e.g., the local operator BS 320 and the UE 322). The spectrum owner may request a local operator BS associated with the spectrum rental request to transmit a reservation signal (e.g., the RRSs 222), a CSI-RS, and/or any other measurement signal that may facilitate interference assessment or management. The spectrum owner may request a UE associated with the spectrum rental request to transmit a reservation signal, an SRS, and/or any other measurement signal that may facilitate interference assessment and management.

At step 915, the spectrum owner server transmits a measurement signal reception request to the spectrum owner nodes (e.g., the spectrum owner BSs 310 and UEs 312). The spectrum owner may request the spectrum owner nodes to measure measurements signals received from the local operator nodes.

At step 920, in response to the measurement signal measurement request, the local operator nodes transmit measurement signals (e.g., reservation signals, RRSs, SRSs, and CSI-RSs) over the spectrum. In some embodiments, a local operator BS requesting the rental may receive the measurement signal request and in turn instruct a UE that requested communication with the local operator BS to transmit a measurement signal.

At step 925, the spectrum owner nodes receive the measurement signals. The spectrum owner nodes measure the receive signal strengths of the measurement signals and generate signal measurement reports, for example, indicating the signal strengths. At step 930, the spectrum owner nodes transmit the signal measurement reports to the spectrum owner server.

At step 935, the spectrum owner server determines a spectrum allocation for the spectrum rental request based on the signal measurement reports. For example, the spectrum owner server may determine an expected data rate and an amount of bandwidth and/or a duration that may be required by the spectrum rental request. The spectrum owner server may also determine the geographic coverage area of the local operator nodes based on the signal measurement reports. For example, a spectrum owner node reporting strong measurement signal strengths may indicate that the spectrum owner node is located within a geographic coverage area of the local operator. Thus, the geographic coverage area may be determined as a function of the measurement signal strengths. The spectrum owner server may determine the amount of interference that the local operator nodes may have on the spectrum owner nodes. In some embodiments, the spectrum owner may negotiate with a local operator server to determine pricing and spectrum allocation and perform admission control to determine whether to grant or deny the spectrum rental. For example, the spectrum owner server determines that there are sufficient idle resources in the spectrum and/or the interference from the local operator nodes to the spectrum owner nodes may not be significant.

At step 940, the spectrum owner server transmits a spectrum rental grant to the local operator nodes. Subsequently, the local operator nodes may function as a primary user and the spectrum owner nodes may function as a secondary user over the duration (e.g., the rental time period 440) of the rental.

Alternatively, the spectrum owner server may determine that the spectrum owner network may have a high traffic load during the rental period and/or the local operator nodes may generate a significant amount of interference to the spectrum owner nodes. In such embodiments, the spectrum owner server may transmit a spectrum rental response denying the spectrum rental request from the local operator node.

In some other embodiments, the spectrum owner server may determine that the spectrum owner network may have a significant amount of traffic in the requested period. Instead of denying the spectrum rental request, the spectrum owner server may grant the rental, but may request the local operator nodes to reduce the transmit power level. For example, the spectrum owner server may indicate a transmission power adjustment for the local operator nodes in the spectrum rental grant. While the method 900 is described in the context of a spectrum negotiation with a spectrum owner server, in some other embodiments, the local operator nodes may communicate over a wireless link (e.g., the links 125, 314, 324) with a BS of the spectrum owner acting as a central unit instead.

Figure 10:
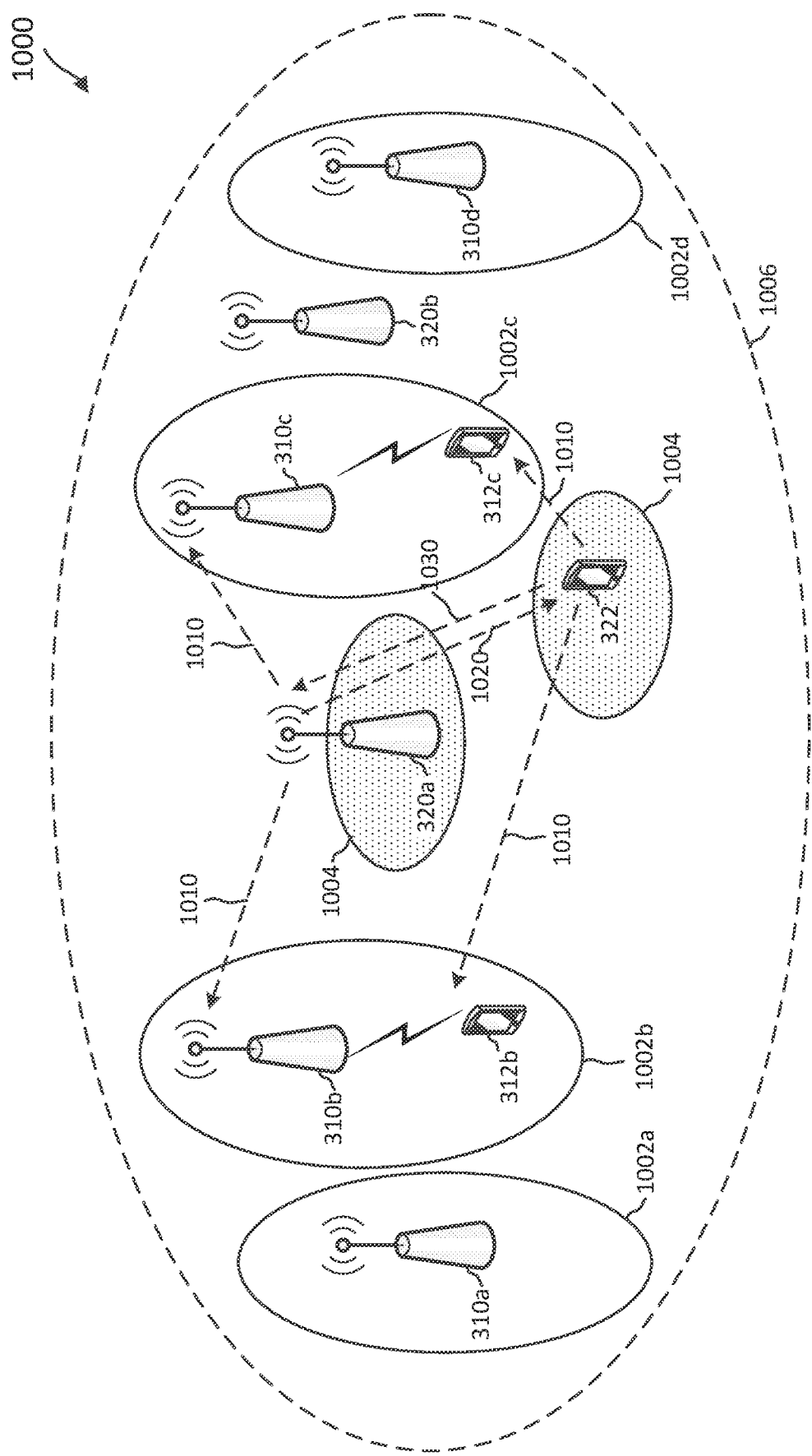
FIG. 10 illustrates a spectrum renting scenario according to embodiments of the present disclosure.
Figure 11:
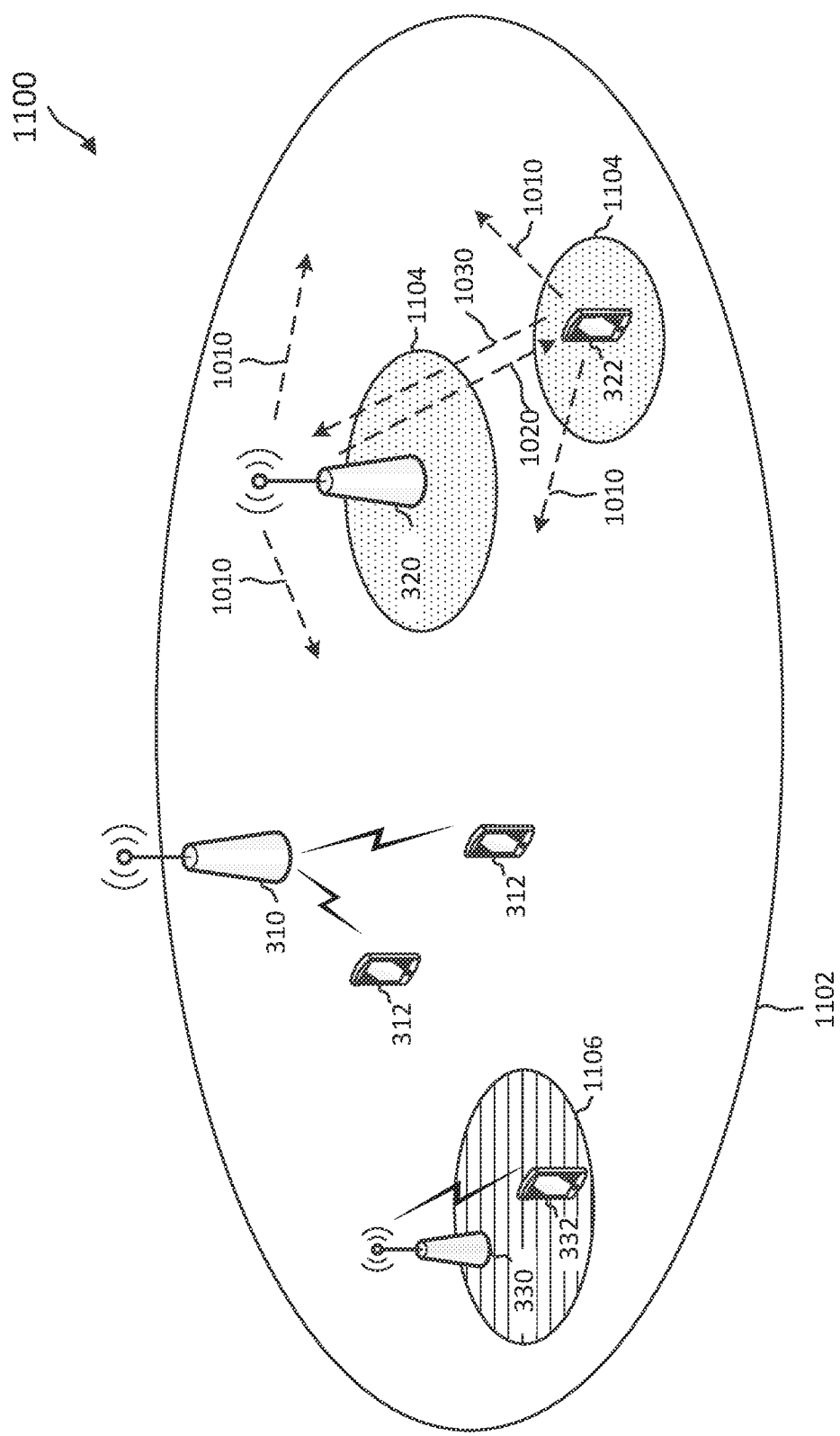
FIG. 11 illustrates a spectrum renting scenario according to embodiments of the present disclosure.
Figure 12:
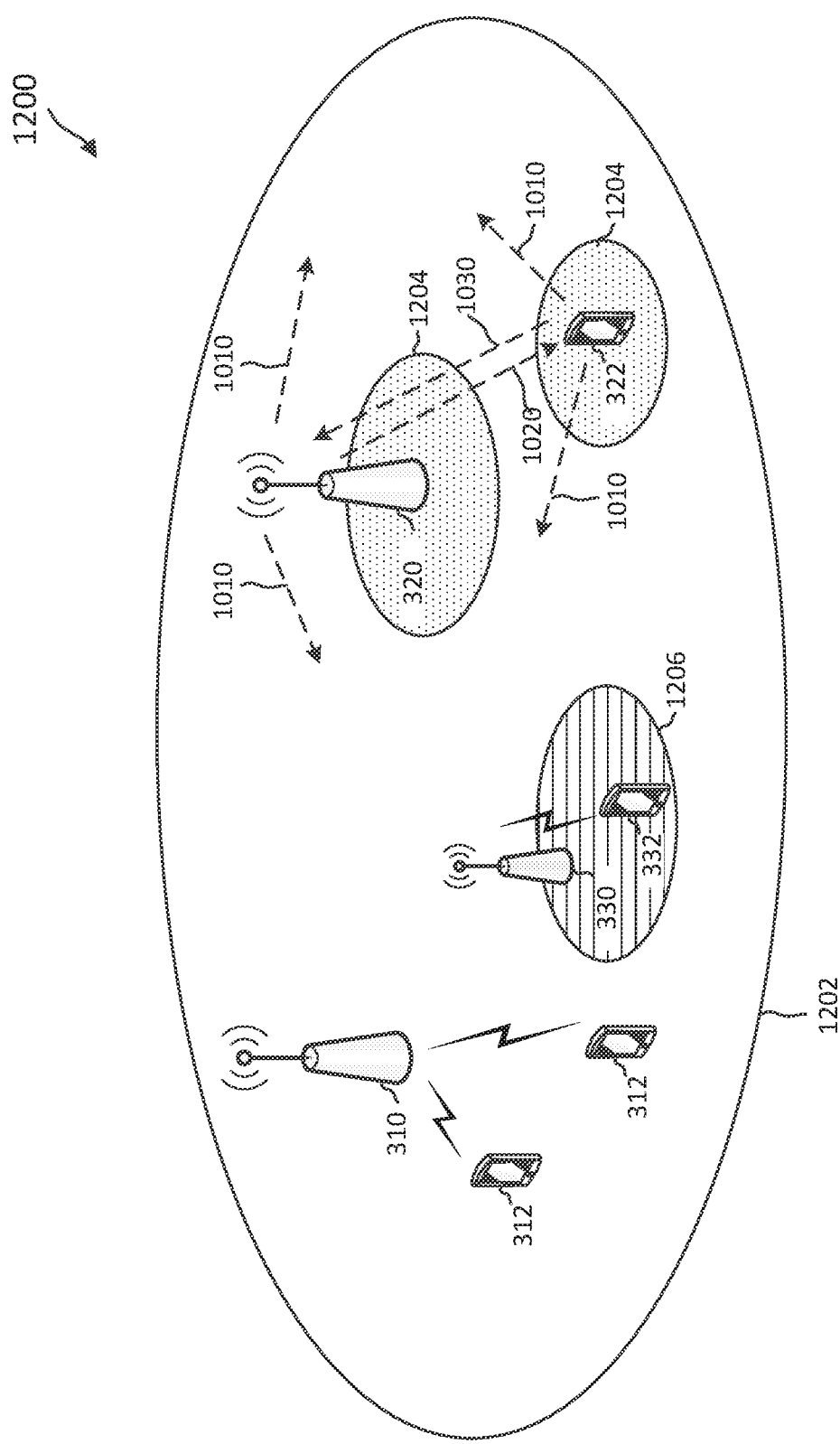
FIG. 12 illustrates a spectrum renting scenario according to embodiments of the present disclosure.

FIGS. 10-12 illustrate various spectrum renting scenarios based on spectrum renting mechanisms in the network 300, the scenarios 410, 420 and 800, and the method 900 described above with respect to FIGS. 3, 4, 8, and 9, respectively, where spectrum rental requests may be granted or denied depending on the surrounding network traffic condition.

FIG. 10 illustrates a spectrum renting scenario 1000 according to embodiments of the present disclosure. In the scenario 1000, a spectrum owner owns a spectrum (e.g., the spectrum 201) across a geographic area 1006. The spectrum owner includes BSs 310a, 310b, 310c, and 310d and UEs 312b and 312c. As shown, the BS 310a is located in a geographic area 1002a within the geographic area 1006. The BS 310b and the UE 312b are located in a geographic area 1002b within the geographic area 1006 and are in communication with each other over the spectrum. The BS 310c and the UE 312c are located in a geographic area 1002c within the geographic area 1006 and are in communication with each other over the spectrum. The BS 310d is located in a geographic area 1002d within the geographic area 1006. In addition, the scenario 1000 includes two local operator BSs 320 located in the geographic area 1006. The spectrum owner is a primary user of the spectrum and may share the spectrum with the local operator operating as a secondary user of the spectrum.

As an example, a UE 322 initiates a communication or a service with the local operator BS 320a, where the UE 322 and the local operator 320a are located in geographic areas 1004 within the geographic area 1006. The UE 322 may be operated by any operator. The local operator BS 320a may negotiate with the spectrum owner, for example, a spectrum owner server such as the central unit 340, to rent the spectrum for a time period (e.g., the rental time period 440) to serve the UE 322. The spectrum owner server may instruct the local operator BS 320a and the UE 322 to transmit measurement signals to facilitate interference measurement. The spectrum owner server may instruct the spectrum owner BSs 310 and the UEs 312 to perform signal measurements to facilitate spectrum allocation.

As shown, the local operator BS 320a transmits RRS signals 1010 (e.g., the RRS signals 222) and a CSI-RS 1020, and the UE 322 transmits RRS signals 1010 and an SRS 1030. The nearby spectrum owner BSs 310b and 310c and the UEs 312b and 312c may receive the measurement signals (e.g., the RRS signals 1010, the CSI-RS 1020, and the SRS 1030) and generate signal measurement reports. The spectrum owner BSs 310b and 310c and the spectrum owner UEs 312b and 312c may provide the signal measurement reports to the spectrum owner server.

Based on the signal measurement reports, the spectrum owner server may determine that the local operator can be promoted to a primary user of the spectrum. As a local operator network becomes a primary user in a certain area, inter-operator interference is required to be managed. For example, gap areas may be required to separate the primary BSs of different operators. As shown in the scenario 1000, the geographic areas 1002b and 1002c function as the gap areas, where the BSs 310b and 310c and the UEs 312b and 312c are demoted to become secondary users of the spectrum. The BSs 310a and the BS 310d may remain as primary users of the spectrum in the geographic areas 1002a and 1002d, respectively.

FIG. 11 illustrates a spectrum renting scenario 1100 according to embodiments of the present disclosure. In the scenario 1100, a spectrum owner owns a spectrum (e.g., the spectrum 201) across a geographic area 1102. The spectrum owner operates a BS 310 and UEs 312 located in the geographic area 1102. The spectrum owner BS 310 is in communication with the UEs 312. In addition, a first local operator operates a BS 320 located in a geographic area 1104 within the geographic area 1102. Further, a second local operator operates a BS 330 located in a geographic area 1106 within the geographic area 1102. The spectrum owner is a primary user of the spectrum and may share the spectrum with the first local operator and the second local operator operating as secondary users of the spectrum.

As an example, a UE 322 initiates a communication or a service with the first local operator BS 320. Similar to the scenario 1000, the first local operator BS 320 may negotiate a spectrum rental with the spectrum owner (e.g., the central unit 340) and the spectrum owner may request measurement signal transmissions from the first local operator nodes and measurement reports from the spectrum owner nodes. The local operator BS 320 may transmit RRS signals 1010 and a CSI-RS 1020. The UE 322 may transmit RRS signals 1010 and an SRS 1030. The spectrum owner BS 310 and UEs 322 may receive the RRS signals 1010, the CSI-RS 1020, and the SRS 1030 and generate signal measurement reports. The spectrum owner may determine that the UE 322 is close to the local operator BS 320 and thus may grant the spectrum rental, allowing the local operator BS 320 and the UE 322 to communicate over the spectrum as primary users. Since the UE 322 and the local operator BS 320 are close to each other, the spectrum owner BS 310 and the UEs 312 may remain as primary users of the spectrum. The second operator BS 330 and the UE 332 may continue to communicate as secondary users of the spectrum. As can be seen in the scenario 1100, a large-area cell (e.g., the geographic area 1102) and small-area cells (e.g., the geographic areas 1104 and 1106) within the large-cell may coexist as primary users since small-area cells may not be required to transmit at high power levels, and thus the interference from the small-area cells to the large-area cell may be minimal or sufficiently insignificant.

FIG. 12 illustrates a spectrum renting scenario 1200 according to embodiments of the present disclosure. In the scenario 1200, a spectrum owner owns a spectrum (e.g., the spectrum 201) across a geographic area 1202. The spectrum owner operates a BS 310 and UEs 312 located within the geographic area 1202. The spectrum owner BS 310 is in communication with the UEs 312. In addition, a first local operator operates a BS 320 located in a geographic area 1204 within the geographic area 1202. Further, a second local operator operates a BS 330 located in a geographic area 1206 within the geographic area 1202. The spectrum owner is a primary user of the spectrum and may share the spectrum with the first local operator BS 320 and the second local operator BS 330. The second local operator BS 330 may have been promoted to be a primary user of the spectrum for communication with a UE 332 in the geographic area 1206.

As an example, a UE 322 initiates a communication or a service with the first local operator BS 320. Similar to the scenarios 1000 and 1100, the first local operator BS 320 may negotiate a spectrum rental with the spectrum owner (e.g., the central unit 340). The local operator BS 320 may transmit RRS signals 1010 and a CSI-RS 1020. The UE 322 may transmit RRS signals 1010 and an SRS 1030. The spectrum owner BS 310 and UEs 322 may receive the RRS signals 1010, the CSI-RS 1020, and the SRS 1030 and generate signal measurement reports. Since the second local operator BS 330 is close to the first local operator BS 320 and had already been promoted to be a primary user, the spectrum owner may deny the spectrum rental request from the first local operator BS 320 to avoid interference from the first local operator to the second local operator. As can be seen in the scenario 1200, when local operators are located in an overlapping area or sufficiently close to each other, only one of the local operators can be promoted to be a primary user at a given time.

Figure 13:
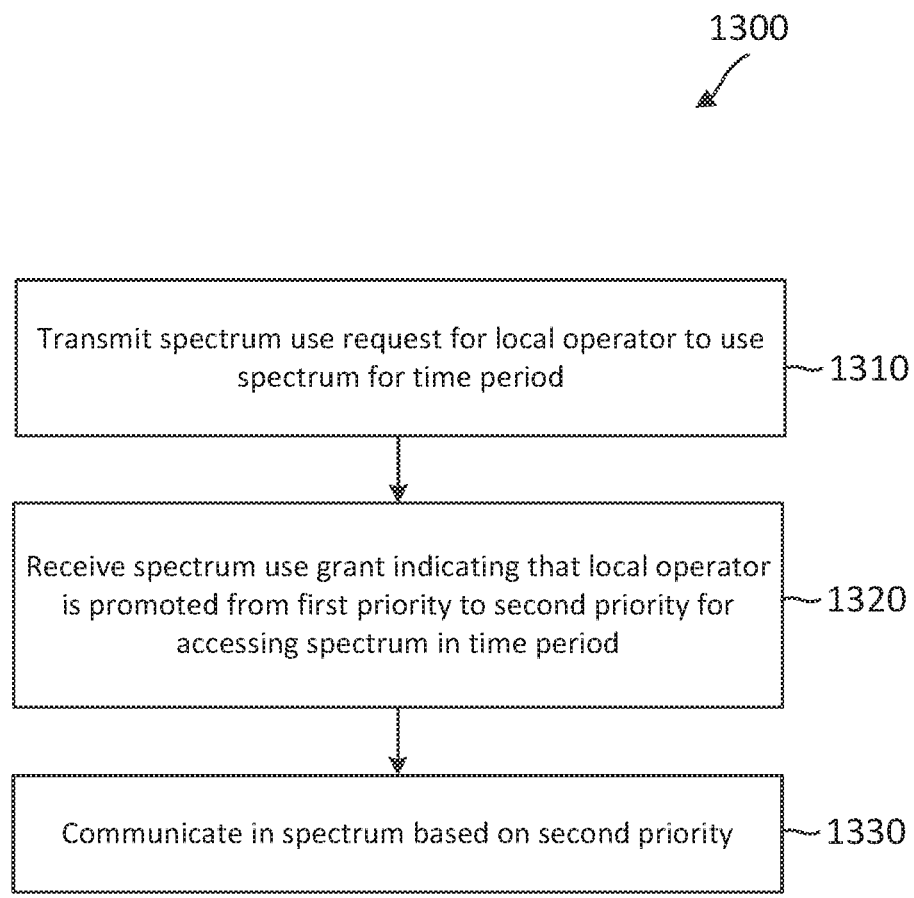
FIG. 13 is a flow diagram of a spectrum use method according to embodiments of the present disclosure.

FIG. 13 is a flow diagram of a spectrum use method 1300 according to embodiments of the present disclosure. Steps of the method 1300 can be executed by a computing device (e.g., a processor, processing circuit, and/or other suitable component) of a wireless communication device, such as the BSs 105, 320, 330, and 600 and the UEs 115, 322, 322, and

500. The method 1300 may employ similar mechanisms as in the schemes 200, the network 300, the method 900, and the scenarios 800, 1000, 1100, and 1200 described with respect to FIGS. 2, 3, 9, 8, 10, 11, and 12 respectively. As illustrated, the method 1300 includes a number of enumerated steps, but embodiments of the method 1300 may include additional steps before, after, and in between the enumerated steps. In some embodiments, one or more of the enumerated steps may be omitted or performed in a different order.

At step 1310, the method 1300 includes transmitting a spectrum use request for a local operator to use a spectrum (e.g., the spectrum 201) for a time period (e.g., the rental time period 440). The wireless communication device may be a local operator BS (e.g., the BS 320) or a UE (e.g., the UE 322) requesting a service from the local operator BS. The wireless communication device may transmit the request to a controlling entity (e.g., the central unit 340 or a BS 310 functioning as a central unit 340) of the spectrum. At step 1320, the method 1300 includes receiving a spectrum use grant indicating that the local operator is promoted from a first priority to a second priority for accessing the spectrum in the time period. The spectrum use grant may be received from the controlling entity in response to the spectrum use request. The first priority may be a secondary user priority and the second priority may be a primary user priority. Thus, the local operator may have guaranteed access to the spectrum in the time period. In some instances, the spectrum use request represents a spectrum rental request and the spectrum grant request represents a spectrum rental grant.

At step 1330, the method 1300 includes communicating in the spectrum based on the second priority.

In some embodiments, the spectrum use request may further indicate a geographic coverage area (e.g., the geographic areas 304, 1004, 1104, 1106, 1204, and 1206) of the local operator. The spectrum use grant promotes the local operator to be a primary user of the spectrum in the geographic coverage area (e.g., the geographic areas 304, 1004, 1104, 1106, 1204, and 1206) of the local operator. As such, another operator (e.g., the spectrum owner or the controlling entity) in the geographic coverage area of the local operator may be demoted from a primary user to a secondary user of the spectrum. In some embodiments, the spectrum use grant may additionally indicate a transmission power adjustment (e.g., a reduction) that the local operator may use during the requested time period.

Figure 14:
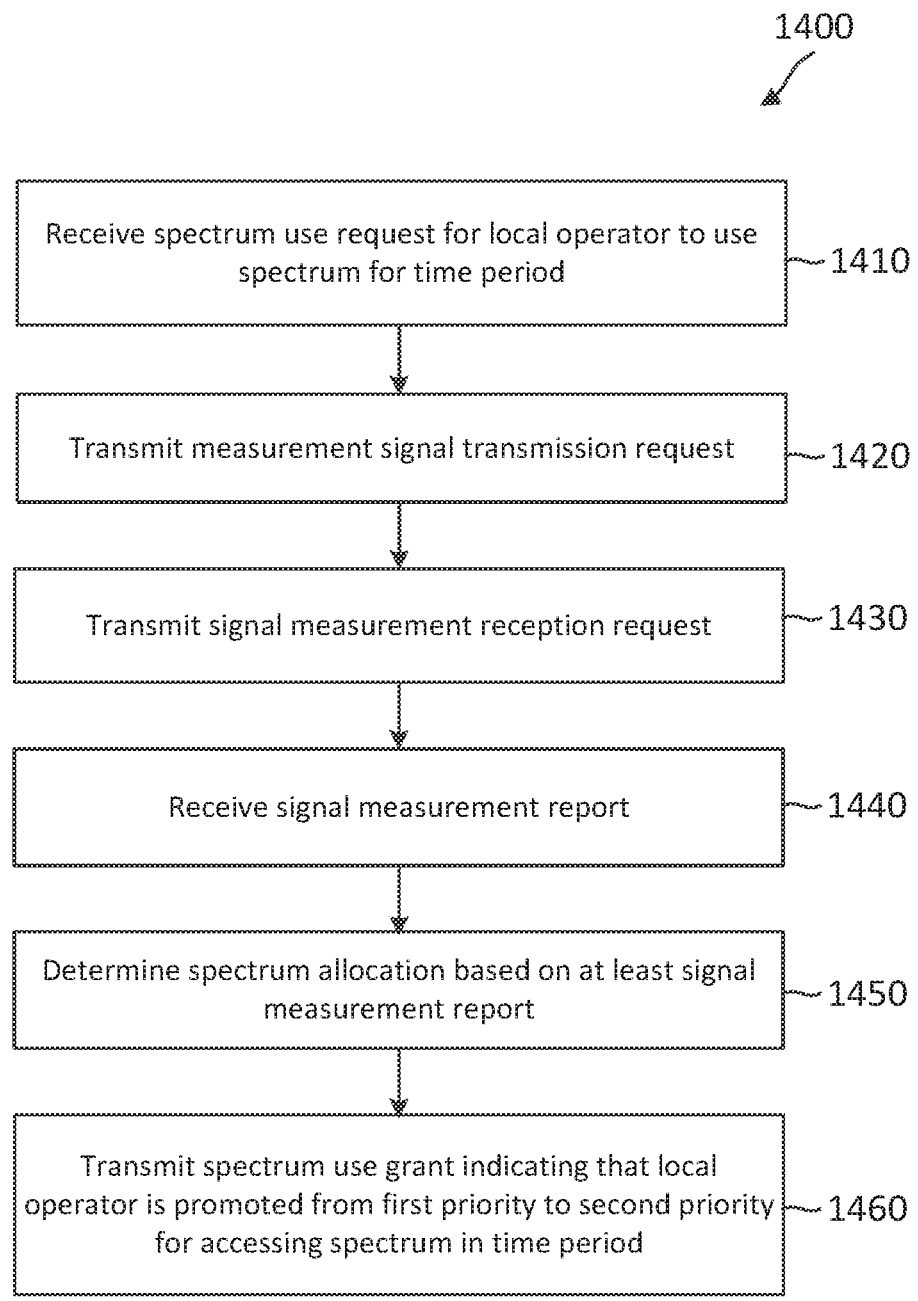
FIG. 14 is a flow diagram of a spectrum use method according to embodiments of the present disclosure.

FIG. 14 is a flow diagram of a spectrum use method 1400 according to embodiments of the present disclosure. Steps of the method 1400 can be executed by a computing device (e.g., a processor, processing circuit, and/or other suitable component) of a communication device, such as the central units 340 and 700 and BSs 105, 310, and 600. The method 1400 may employ similar mechanisms as in the schemes 200, the network 300, the method 900, and the scenarios 800, 1000, 1100, and 1200 described with respect to FIGS. 2, 3, 9, 8, 10, 11, and 12 respectively. As illustrated, the method 1400 includes a number of enumerated steps, but embodiments of the method 1400 may include additional steps before, after, and in between the enumerated steps. In some embodiments, one or more of the enumerated steps may be omitted or performed in a different order.

At step 1410, the method 1400 includes receiving a spectrum use request for a local operator to use a spectrum (e.g., the spectrum 201) for a time period (e.g., the rental time period 440). The communication device may be a controlling entity (e.g., a spectrum owner) of the spectrum. The wireless communication device may receive the request from a local operator BS (e.g., the BSs 320 and 330) or a UE (e.g., the UEs 322 and 332) requesting a service from a local operator BS. The local operator may be a local store or a local business providing wireless services.

At step 1420, the method 1400 includes transmitting a measurement signal transmission request, for example, to at least the local operator BS the UE that triggered the spectrum use request. The measurement signal request is for a transmission of a measurement signal, such as a reservation signal (e.g., the RRS signals 222 and 1010), a CSI-RS (e.g., the CSI-RS 1020), and/or an SRS (e.g., the SRS 1030).

At step 1430, the method 1400 includes transmitting a measurement signal reception request, for example, to a wireless communication device associated with the controlling entity or communicating in the spectrum as a primary user.

At step 1440, the method 1400 includes receiving a signal measurement report, for example, from the wireless communication device. The report may indicate the receive signal strength of the measurement signal at the wireless communication device.

At step 1450, the method 1400 includes determining a spectrum allocation for the spectrum use request based on at least the signal measurement report.

At step 1460, the method 1400 includes transmitting a spectrum use grant indicating that the local operator is promoted from a first priority to a second priority for accessing the spectrum in the time period. The first priority may be a secondary user priority and the second priority may be a primary user priority.

Figure 15:
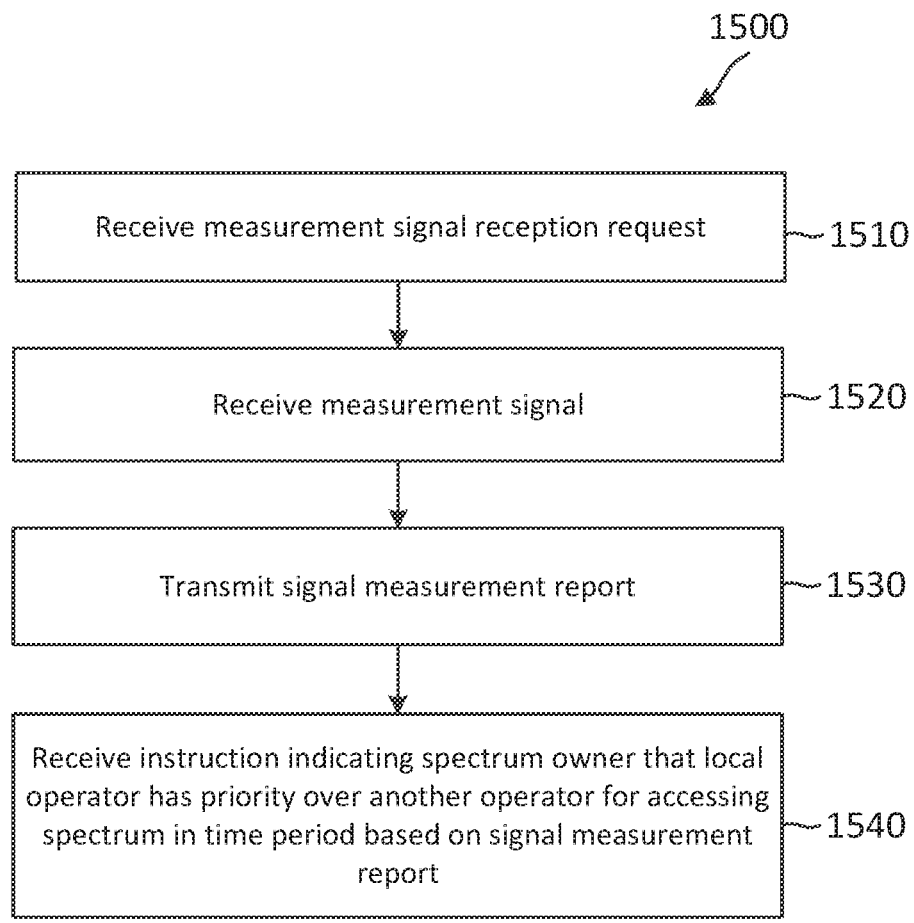
FIG. 15 is a flow diagram of a spectrum use method according to embodiments of the present disclosure.

FIG. 15 is a flow diagram of a spectrum use method 1500 according to embodiments of the present disclosure. Steps of the method 1500 can be executed by a computing device (e.g., a processor, processing circuit, and/or other suitable component) of a wireless communication device, such as the BSs 105, 310, and 600 and the UEs 115, 312, and 500. The method 1500 may employ similar mechanisms as in the schemes 200, the network 300, the method 900, and the scenarios 800, 1000, 1100, and 1200 described with respect to FIGS. 2, 3, 9, 8, 10, 11, and 12 respectively. As illustrated, the method 1500 includes a number of enumerated steps, but embodiments of the method 1500 may include additional steps before, after, and in between the enumerated steps. In some embodiments, one or more of the enumerated steps may be omitted or performed in a different order.

At step 1510, the method 1500 includes receiving a measurement signal reception request from a controlling entity (e.g., the central unit 340 of the spectrum owner) of a spectrum (e.g., the spectrum 201). The request is for receiving a measurement signal in a spectrum and determining a measurement (e.g., signal strength) for the measurement signal. The wireless communication device may be associated with the controlling entity or communicating in the spectrum as a primary user.

At step 1520, the method 1500 includes receiving a measurement signal in the spectrum. The measurement signal may be a reservation signal (e.g., the RRS signals 222 and 1010), a CSI-RS (e.g., the CSI-RS 1020), and/or an SRS (e.g., the SRS 1030) transmitted by a local operator node (e.g., the BS 320 and the UE 322).

At step 1530, the method 1500 includes transmitting a signal measurement report to the controlling entity based on the received measurement signal. The wireless communication device may determine a receive signal strength of the measurement signal and include the signal strength in the signal measurement report.

At step 1540, the method 1500 includes receiving an instruction from the controlling entity indicating that the local operator has priority over another operator (e.g., the controlling entity) for accessing the spectrum in a time period (e.g., the rental time period 440) based on the signal measurement report. The first priority may be a primary user priority and the second priority may be a secondary user priority.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Embodiments of the present disclosure include a method of wireless communication, comprising transmitting, by a first wireless communication device to a controlling entity of a spectrum, a spectrum use request for a local operator to use the spectrum for a time period; and receiving, by the first wireless communication device from the controlling entity, a spectrum use grant indicating that the local operator is promoted from a first priority to a second priority for accessing the spectrum during the time period.

The method further includes wherein the time period includes a plurality of transmission opportunities (TXOPs), and wherein the local operator has priority over another operator for accessing the spectrum in the plurality of TXOPs based on the spectrum use grant. The method further includes wherein the another operator is the controlling entity. The method further comprises communicating, by the first wireless communication device with a second wireless communication device in the spectrum during the time period based on the second priority, wherein at least the first wireless communication device or the second wireless communication device is associated with the local operator. The method further comprises determining, by the first wireless communication device, the time period based on a communication requirement between the first wireless communication device and the second wireless communication device. The method further includes wherein the spectrum use request is for a geographic coverage area of the local operator, wherein the first wireless communication device and the second wireless communication device are located within the geographic coverage area, and wherein the communicating includes communicating in the spectrum over the geographic coverage area. The method further includes wherein the another operator is located within the geographic coverage area of the local operator. The method further includes wherein the spectrum use grant further indicates a transmission power adjustment, and wherein the communicating includes communicating based on the transmission power adjustment. The method further comprises receiving, by the first wireless communication device, a request to transmit a measurement signal. The method further includes wherein the measurement signal includes least one of a reservation signal, a channel state information-reference signals (CSI-RS), or a sounding reference signal (SRS). The method further comprises transmitting, by the first wireless communication device, the measurement signal. The method further comprises transmitting, by the first wireless communication device, an instruction instructing the second wireless communication device to transmit the measurement signal, wherein the first wireless communication device is associated with the local operator.

Embodiments of the present disclosure further include a method of wireless communication, comprising receiving, by a controlling entity of a spectrum, a spectrum use request for a local operator to use the spectrum for a time period; and transmitting, by the controlling entity, a spectrum use grant indicating that the local operator is promoted from a first priority to a second priority for accessing the spectrum during the time period.

The method further includes wherein the time period includes a plurality of transmission opportunities (TXOPs), wherein method further comprises granting the local operator a priority over another operator for accessing the spectrum in the plurality of TXOPs. The method further includes wherein the another operator is the controlling entity. The method further comprises transmitting, by the controlling entity to one or more first wireless communication devices, a request to transmit a measurement signal, wherein at least one of the one or more first wireless communication devices is associated with the local operator. The method further includes wherein the measurement signal includes at least one of a reservation signal, a channel state information-reference signals (CSI-RS), or a sounding reference signal (SRS). The method further includes comprises transmitting, by the controlling entity to a second wireless communication device associated with the another operator, a request to receive the measurement signal; receiving, by the controlling entity from the second wireless communication device, a signal measurement report including at least a signal strength of the measurement signal; and determining, by the controlling entity, to promote the local operator from the first priority to the second priority based on at least the signal measurement report. The method further comprises determining, by the controlling entity, a geographic coverage area based on the signal strength of the measurement signal, wherein the another operator is within the geographic coverage area. The method further comprises determining, by the controlling entity, to promote the local operator from the first priority to the second priority based on at least an expected traffic load of the another operator during the time period. The method further comprises determining, by the controlling entity, a transmission power adjustment based on at least the signal measurement report, wherein the spectrum use grant further indicates the transmission power adjustment.

Embodiments of the present disclosure further include a method of wireless communication, comprising receiving, by a first wireless communication device from a second wireless communication device, a measurement signal in a spectrum; transmitting, by the first wireless communication device to a controlling entity of the spectrum, a signal measurement report based on the measurement signal; and receiving, by the first wireless communication device from the controlling entity, an instruction indicating that a local operator has priority over another operator for accessing the spectrum in a time period based on at least the signal measurement report.

The method further comprises receiving, by the first wireless communication device, a request to receive the measurement signal; and determining, by the first wireless communication device, a signal strength of the measurement signal, wherein the signal measurement report indicates the signal strength of the measurement signal. The method further includes wherein the time period includes a plurality of transmission opportunities (TXOPs). The method further includes wherein the first wireless communication device is associated with the another operator, and wherein the second wireless communication device is associated with the local operator. The method further includes wherein the first wireless communication device is located within a geographic coverage area of the local operator. The method further includes wherein the another operator is a controlling entity of the spectrum.

Embodiments of the present disclosure further include an apparatus comprising a transceiver configured to transmit, to a controlling entity of a spectrum, a spectrum use request for a local operator to use the spectrum for a time period; and receive, from the controlling entity, a spectrum use grant indicating that the local operator is promoted from a first priority to a second priority for accessing the spectrum during the time period.

The apparatus further includes wherein the time period includes a plurality of transmission opportunities (TXOPs), and wherein the local operator has priority over another operator for accessing the spectrum in the plurality of TXOPs based on the spectrum use grant. The apparatus further includes wherein the another operator is the controlling entity. The apparatus further includes wherein the transceiver is further configured to communicate with a second wireless communication device in the spectrum during the time period based on the second priority, and wherein at least the first wireless communication device or the second wireless communication device is associated with the local operator. The apparatus further comprises a processor configured to determine the time period based on a communication requirement between the apparatus and the second wireless communication device. The apparatus further includes wherein the spectrum use request is for a geographic coverage area of the local operator, wherein the apparatus and the second wireless communication device are located within the geographic coverage area, and wherein the transceiver is further configured to communicate with the second wireless communication device in the spectrum over the geographic coverage area. The apparatus further includes wherein the another operator is located within the geographic coverage area of the local operator. The apparatus further includes wherein the spectrum use grant further indicates a transmission power adjustment, and wherein the transceiver is further configured to communicate with the second wireless communication device based on the transmission power adjustment. The apparatus further includes wherein the transceiver is further configured to receive a request to transmit a measurement signal. The apparatus further includes wherein the measurement signal includes least one of a reservation signal, a channel state information-reference signals (CSI-RS), or a sounding reference signal (SRS). The apparatus further includes wherein the transceiver is further configured to transmit the measurement signal. The apparatus further includes wherein the transceiver is further configured to transmit an instruction instructing the second wireless communication device to transmit the measurement signal, wherein the apparatus is associated with the local operator.

Embodiments of the present disclosure further include an apparatus comprising a transceiver configured to receive a spectrum use request for a local operator to use a spectrum for a time period; and transmit a spectrum use grant indicating that the local operator is promoted from a first priority to a second priority for accessing the spectrum during the time period.

The apparatus further includes wherein the time period includes a plurality of transmission opportunities (TXOPs), wherein apparatus further comprises a processor configured to grant the local operator a priority over another operator for accessing the spectrum in the plurality of TXOPs. The apparatus further includes wherein the apparatus is associated with a controlling entity of the spectrum, and wherein the another operator is the controlling entity. The apparatus further includes wherein the transceiver is further configured to transmit, to one or more first wireless communication devices, a request to transmit a measurement signal, and wherein at least one of the one or more first wireless communication devices is associated with the local operator. The apparatus further includes wherein the measurement signal includes at least one of a reservation signal, a channel state information-reference signals (CSI-RS), or a sounding reference signal (SRS). The apparatus further includes wherein the transceiver is further configured to transmit, to a second wireless communication device associated with the another operator, a request to receive the measurement signal; and receive, from the second wireless communication device, a signal measurement report including at least a signal strength of the measurement signal, and wherein the apparatus further comprises a processor configured to determine to promote the local operator from the first priority to the second priority based on at least the signal measurement report. The apparatus further includes wherein the processor is further configured to determine a geographic coverage area based on the signal strength of the measurement signal, and wherein the another operator is within the geographic coverage area. The apparatus further includes wherein the processor is further configured to determine to promote the local operator from the first priority to the second priority based on at least an expected traffic load of the another operator during the time period. The apparatus further includes wherein the processor is further configured to determine a transmission power adjustment based on at least the signal measurement report, and wherein the spectrum use grant further indicates the transmission power adjustment.

Embodiments of the present disclosure further include an apparatus comprising a transceiver configured to receive, from a second wireless communication device, a measurement signal in a spectrum; transmit, to a controlling entity of the spectrum, a signal measurement report based on the measurement signal; and receive, from the controlling entity, an instruction indicating that a local operator has priority over another operator for accessing the spectrum in a time period based on at least the signal measurement report.

The apparatus further includes wherein the transceiver is further configured to receive, from the controlling entity, a request to receive the measurement signal, wherein the apparatus further comprises a processor configured to determine a signal strength of the measurement signal, and wherein the signal measurement report indicates the signal strength of the measurement signal. The apparatus further includes wherein the time period includes a plurality of transmission opportunities (TXOPs). The apparatus further includes wherein the apparatus is associated with the another operator, and wherein the second wireless communication device is associated with the local operator. The apparatus further includes wherein the apparatus is located within a geographic coverage area of the local operator. The apparatus further includes wherein the another operator is the controlling entity of the spectrum.

Embodiments of the present disclosure further include a computer-readable medium having program code recorded thereon, the program code comprising code for causing a first wireless communication device to transmit, to a controlling entity of a spectrum, a spectrum use request for a local operator to use the spectrum for a time period; and code for causing the first wireless communication device to receive, from the controlling entity, a spectrum use grant indicating that the local operator is promoted from a first priority to a second priority for accessing the spectrum during the time period.

The computer-readable medium further includes wherein the time period includes a plurality of transmission opportunities (TXOPs), and wherein the local operator has priority over another operator for accessing the spectrum in the plurality of TXOPs based on the spectrum use grant. The computer-readable medium further includes wherein the another operator is the controlling entity. The computer-readable medium further comprises code for causing the first wireless communication device to communicate with a second wireless communication device in the spectrum during the time period based on the second priority, wherein at least the first wireless communication device or the second wireless communication device is associated with the local operator. The computer-readable medium further comprises code for causing the first wireless communication device to determine the time period based on a communication requirement between the first wireless communication device and the second wireless communication device. The computer-readable medium further includes wherein the spectrum use request is for a geographic coverage area of the local operator, wherein the first wireless communication device and the second wireless communication device are located within the geographic coverage area, and wherein the code for causing the first wireless communication device to communicate is further configured to communicate with the second wireless communication device in the spectrum over the geographic coverage area. The computer-readable medium further includes wherein the another operator is located within the geographic coverage area of the local operator. The computer-readable medium further includes wherein the spectrum use grant further indicates a transmission power adjustment, and wherein the code for causing the first wireless communication device to communicate is further configured to communicate with the second wireless communication device based on the transmission power adjustment. The computer-readable medium further comprises the code for causing the first wireless communication device to receive a request to transmit a measurement signal. The computer-readable medium further includes wherein the measurement signal includes least one of a reservation signal, a channel state information-reference signals (CSI-RS), or a sounding reference signal (SRS). The computer-readable medium further comprises code for causing the first wireless communication device to transmit the measurement signal. The computer-readable medium further comprises code for causing the first wireless communication device to transmit an instruction instructing the second wireless communication device to transmit the measurement signal, wherein the first wireless communication device is associated with the local operator.

Embodiments of the present disclosure further include a computer-readable medium having program code recorded thereon, the program code comprising code for causing a controlling entity if a spectrum to receive a spectrum use request for a local operator to use the spectrum for a time period; and code for causing the controlling entity to transmit a spectrum use grant indicating that the local operator is promoted from a first priority to a second priority for accessing the spectrum during the time period.

The computer-readable medium further includes wherein the time period includes a plurality of transmission opportunities (TXOPs), wherein computer-readable medium further comprises code for causing the controlling entity to grant the local operator a priority over another operator for accessing the spectrum in the plurality of TXOPs. The computer-readable medium further includes wherein the another operator is the controlling entity. The computer-readable medium further comprises code for causing the controlling entity to transmit, to one or more first wireless communication devices, a request to transmit a measurement signal, wherein at least one of the one or more first wireless communication devices is associated with the local operator. The computer-readable medium further includes wherein the measurement signal includes at least one of a reservation signal, a channel state information-reference signals (CSI-RS), or a sounding reference signal (SRS). The computer-readable medium further comprises code for causing the controlling entity to transmit, to a second wireless communication device associated with the another operator, a request to receive the measurement signal; code for causing the controlling entity to receive, from the second wireless communication device, a signal measurement report including at least a signal strength of the measurement signal; and code for causing the controlling entity to determine to promote the local operator from the first priority to the second priority based on at least the signal measurement report. The computer-readable medium further comprises code for causing the controlling entity to determine a geographic coverage area based on the signal strength of the measurement signal, wherein the another operator is within the geographic coverage area. The computer-readable medium further comprises code for causing the controlling entity to determine to promote the local operator from the first priority to the second priority based on at least an expected traffic load of the another operator during the time period. The computer-readable medium further comprises code for causing the controlling entity to determine a transmission power adjustment based on at least the signal measurement report, wherein the spectrum use grant further indicates the transmission power adjustment.

Embodiments of the present disclosure further include a computer-readable medium having program code recorded thereon, the program code comprising code for causing a first wireless communication device to receive, from a second wireless communication device, a measurement signal in a spectrum; code for causing the first wireless communication device to transmit, to a controlling entity of the spectrum, a signal measurement report based on the measurement signal; and code for causing the first wireless communication device to receive, from the controlling entity, an instruction indicating that a local operator has priority over another operator for accessing the spectrum in a time period based on at least the signal measurement report.

The computer-readable medium further includes code for causing the first wireless communication device to receive a request to receive the measurement signal; and code for causing the first wireless communication device to determine a signal strength of the measurement signal, wherein the signal measurement report indicates the signal strength of the measurement signal. The computer-readable medium further includes wherein the time period includes a plurality of transmission opportunities (TXOPs). The computer-readable medium further includes wherein the first wireless communication device is associated with the another operator, and wherein the second wireless communication device is associated with the local operator. The computer-readable medium further includes wherein the first wireless communication device is located within a geographic coverage area of the local operator. The computer-readable medium further includes wherein the another operator is a controlling entity of the spectrum.

Embodiments of the present disclosure further include an apparatus comprising means for transmitting, to a controlling entity of a spectrum, a spectrum use request for a local operator to use the spectrum for a time period; and means for receive, from the controlling entity, a spectrum use grant indicating that the local operator is promoted from a first priority to a second priority for accessing the spectrum during the time period.

The apparatus further includes wherein the time period includes a plurality of transmission opportunities (TXOPs), and wherein the local operator has priority over another operator for accessing the spectrum in the plurality of TXOPs based on the spectrum use grant. The apparatus further includes wherein the another operator is the controlling entity. The apparatus further comprises means for communicating with a second wireless communication device in the spectrum during the time period based on the second priority, and wherein at least the first wireless communication device or the second wireless communication device is associated with the local operator. The apparatus further comprises means for determining the time period based on a communication requirement between the apparatus and the second wireless communication device. The apparatus further includes wherein the spectrum use request is for a geographic coverage area of the local operator, wherein the apparatus and the second wireless communication device are located within the geographic coverage area, and wherein the means for communicating is further configured to communicate with the second wireless communication device in the spectrum over the geographic coverage area. The apparatus further includes wherein the another operator is located within the geographic coverage area of the local operator. The apparatus further includes wherein the spectrum use grant further indicates a transmission power adjustment, and wherein the means for communicating is further configured to communicate with the second wireless communication device based on the transmission power adjustment. The apparatus further comprises means for receiving a request to transmit a measurement signal. The apparatus further includes wherein the measurement signal includes least one of a reservation signal, a channel state information-reference signals (CSI-RS), or a sounding reference signal (SRS). The apparatus further comprises means for transmitting the measurement signal. The apparatus further comprises means for transmitting an instruction instructing the second wireless communication device to transmit the measurement signal, wherein the apparatus is associated with the local operator.

Embodiments of the present disclosure further include an apparatus comprising means for receiving a spectrum use request for a local operator to use a spectrum for a time period; and means for transmitting a spectrum use grant indicating that the local operator is promoted from a first priority to a second priority for accessing the spectrum during the time period.

The apparatus further includes wherein the time period includes a plurality of transmission opportunities (TXOPs), wherein apparatus further comprises means for granting the local operator a priority over another operator for accessing the spectrum in the plurality of TXOPs. The apparatus further includes wherein the apparatus is associated with a controlling entity of the spectrum, and wherein the another operator is the controlling entity. The apparatus further comprises means for transmitting, to one or more first wireless communication devices, a request to transmit a measurement signal, and wherein at least one of the one or more first wireless communication devices is associated with the local operator. The apparatus further includes wherein the measurement signal includes at least one of a reservation signal, a channel state information-reference signals (CSI-RS), or a sounding reference signal (SRS). The apparatus further comprises means for transmitting, to a second wireless communication device associated with the another operator, a request to receive the measurement signal; means for receiving, from the second wireless communication device, a signal measurement report including at least a signal strength of the measurement signal; and means for determining to promote the local operator from the first priority to the second priority based on at least the signal measurement report. The apparatus further comprises means for determining a geographic coverage area based on the signal strength of the measurement signal, wherein the another operator is within the geographic coverage area. The apparatus further includes wherein the means for determining is further configured to determine to promote the local operator from the first priority to the second priority based on at least an expected traffic load of the another operator during the time period. The apparatus further comprises means for determining a transmission power adjustment based on at least the signal measurement report, and wherein the spectrum use grant further indicates the transmission power adjustment.

Embodiments of the present disclosure further include an apparatus comprising means for receiving, from a second wireless communication device, a measurement signal in a spectrum; means for transmitting, to a controlling entity of the spectrum, a signal measurement report based on the measurement signal; and means for receiving, from the controlling entity, an instruction indicating that a local operator has priority over another operator for accessing the spectrum in a time period based on at least the signal measurement report.

The apparatus further comprises means for receiving, from the controlling entity, a request to receive the measurement signal, wherein the apparatus further comprises means for determining a signal strength of the measurement signal, and wherein the signal measurement report indicates the signal strength of the measurement signal. The apparatus further includes wherein the time period includes a plurality of transmission opportunities (TXOPs). The apparatus further includes wherein the apparatus is associated with the another operator, and wherein the second wireless communication device is associated with the local operator. The apparatus further includes wherein the apparatus is located within a geographic coverage area of the local operator. The apparatus further includes wherein the another operator is the controlling entity of the spectrum.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
transmitting, by a first wireless communication device to a controlling entity of a spectrum, a spectrum use request for a local operator to use the spectrum as a primary user with a primary access to the spectrum for a time period; and
receiving, by the first wireless communication device from the controlling entity, a spectrum use grant indicating that the local operator is promoted from being a non-primary user of the spectrum to the primary user with the primary access to the spectrum and another operator is demoted from being the primary user of the spectrum to a non-primary user of the spectrum during a plurality of transmission opportunities (TXOPs) within the time period.

2. The method of claim 1, wherein the another operator is the controlling entity.

3. The method of claim 1, further comprising communicating, by the first wireless communication device with a second wireless communication device in the spectrum during the time period based on having the primary access to the spectrum, wherein at least the first wireless communication device or the second wireless communication device is associated with the local operator.

4. The method of claim 3, further comprising determining, by the first wireless communication device, the time period based on a communication requirement between the first wireless communication device and the second wireless communication device.

5. The method of claim 3, wherein the spectrum use request is for a geographic coverage area of the local operator, wherein the first wireless communication device and the second wireless communication device are located within the geographic coverage area, and wherein the communicating includes communicating in the spectrum over the geographic coverage area.

6. The method of claim 5, wherein the another operator is located within the geographic coverage area of the local operator.

7. The method of claim 3, wherein the spectrum use grant further indicates a transmission power adjustment, and wherein the communicating includes communicating based on the transmission power adjustment.

8. The method of claim 3, further comprising receiving, by the first wireless communication device, a request to transmit a measurement signal.

9. The method of claim 8, wherein the measurement signal includes least one of a reservation signal, a channel state information-reference signals (CSI-RS), or a sounding reference signal (SRS).

10. The method of claim 8, further comprising transmitting, by the first wireless communication device, the measurement signal.

11. The method of claim 8, further comprising transmitting, by the first wireless communication device, an instruction instructing the second wireless communication device to transmit the measurement signal, wherein the first wireless communication device is associated with the local operator.

12. A method of wireless communication, comprising:
receiving, by a controlling entity of a spectrum, a spectrum use request for a local operator to use the spectrum as a primary user with a primary access to the spectrum for a time period; and
transmitting, by the controlling entity, a spectrum use grant indicating that the local operator is promoted from being a non-primary user of the spectrum to the primary user with the primary access to the spectrum and another operator is demoted from being the primary user of the spectrum to a non-primary user of the spectrum during a plurality of transmission opportunities (TXOPs) within the time period.

13. The method of claim 12, further comprising:
granting the local operator a priority over the another operator for accessing the spectrum in the plurality of TXOPs.

14. The method of claim 13, wherein the another operator is the controlling entity.

15. The method of claim 13, further comprising transmitting, by the controlling entity to one or more first wireless communication devices, a request to transmit a measurement signal, wherein at least one of the one or more first wireless communication devices is associated with the local operator.

16. The method of claim 15, wherein the measurement signal includes at least one of a reservation signal, a channel state information-reference signals (CSI-RS), or a sounding reference signal (SRS).

17. The method of claim 15, further comprising:
transmitting, by the controlling entity to a second wireless communication device associated with the another operator, a request to receive the measurement signal;
receiving, by the controlling entity from the second wireless communication device, a signal measurement report including at least a signal strength of the measurement signal; and
determining, by the controlling entity, to promote the local operator from being the non-primary user of the spectrum to the primary user with the primary access to the spectrum based on at least the signal measurement report.

18. The method of claim 17, further comprising determining, by the controlling entity, a geographic coverage area based on the signal strength of the measurement signal, wherein the another operator is within the geographic coverage area.

19. The method of claim 17, further comprising determining, by the controlling entity, to promote the local operator from being the non-primary user of the spectrum to the primary user with the primary access to the spectrum based on at least an expected traffic load of the another operator during the time period.

20. The method of claim 17, further comprising determining, by the controlling entity, a transmission power adjustment based on at least the signal measurement report, wherein the spectrum use grant further indicates the transmission power adjustment.

21. An apparatus comprising:
a transceiver configured to:
transmit, to a controlling entity of a spectrum, a spectrum use request for a local operator to use the spectrum as a primary user with a primary access to the spectrum for a time period; and
receive, from the controlling entity, a spectrum use grant indicating that the local operator is promoted from being a non-primary user of the spectrum to the primary user with the primary access to the spectrum and another operator is demoted from being the primary user of the spectrum to a non-primary user of the spectrum during a plurality of transmission opportunities (TXOPs) within the time period.

22. The apparatus of claim 21, wherein the another operator is the controlling entity.

23. The apparatus of claim 21, wherein the transceiver is further configured to communicate with a second wireless communication device in the spectrum during the time period based on having the primary access to the spectrum, and wherein at least the apparatus or the second wireless communication device is associated with the local operator.

24. The apparatus of claim 23, further comprising a processor configured to determine the time period based on a communication requirement between the apparatus and the second wireless communication device.

25. The apparatus of claim 23, wherein the spectrum use request is for a geographic coverage area of the local operator, wherein the apparatus and the second wireless communication device are located within the geographic coverage area, and wherein the transceiver is further configured to communicate with the second wireless communication device in the spectrum over the geographic coverage area.

26. The apparatus of claim 25, wherein the another operator is located within the geographic coverage area of the local operator.

27. The apparatus of claim 23, wherein the spectrum use grant further indicates a transmission power adjustment, and wherein the transceiver is further configured to communicate with the second wireless communication device based on the transmission power adjustment.

28. The apparatus of claim 23, wherein the transceiver is further configured to receive a request to transmit a measurement signal.

29. The apparatus of claim 28, wherein the measurement signal includes least one of a reservation signal, a channel state information-reference signals (CSI-RS), or a sounding reference signal (SRS).

30. The apparatus of claim 28, wherein the transceiver is further configured to transmit the measurement signal.

31. The apparatus of claim 28, wherein the transceiver is further configured to transmit an instruction instructing the second wireless communication device to transmit the measurement signal, wherein the apparatus is associated with the local operator.

32. An apparatus comprising:
a transceiver configured to:
receive a spectrum use request for a local operator to use a spectrum as a primary user with a primary access to the spectrum for a time period; and
transmit a spectrum use grant indicating that the local operator is promoted from being a non-primary user of the spectrum to the primary user with the primary access to the spectrum and another operator is demoted from being the primary user of the spectrum to a non-primary user of the spectrum during a plurality of transmission opportunities (TXOPs) within the time period.

33. The apparatus of claim 32, wherein apparatus further comprises a processor configured to grant the local operator a priority over the another operator for accessing the spectrum in the plurality of TXOPs.

34. The apparatus of claim 33, wherein the apparatus is associated with a controlling entity of the spectrum, and wherein the another operator is the controlling entity.

35. The apparatus of claim 33, wherein the transceiver is further configured to transmit, to one or more first wireless communication devices, a request to transmit a measurement signal, and wherein at least one of the one or more first wireless communication devices is associated with the local operator.

36. The apparatus of claim 35, wherein the measurement signal includes at least one of a reservation signal, a channel state information-reference signals (CSI-RS), or a sounding reference signal (SRS).

37. The apparatus of claim 35, wherein the transceiver is further configured to:
transmit, to a second wireless communication device associated with the another operator, a request to receive the measurement signal; and
receive, from the second wireless communication device, a signal measurement report including at least a signal strength of the measurement signal, and
wherein the apparatus further comprises a processor configured to determine to promote the local operator from being the non-primary user of the spectrum to the primary user with the primary access to the spectrum based on at least the signal measurement report.

38. The apparatus of claim 37, wherein the processor is further configured to determine a geographic coverage area based on the signal strength of the measurement signal, and wherein the another operator is within the geographic coverage area.

39. The apparatus of claim 37, wherein the processor is further configured to determine to promote the local operator from being the non-primary user of the spectrum to the primary user with the primary access to the spectrum based on at least an expected traffic load of the another operator during the time period.

40. The apparatus of claim 37, wherein the processor is further configured to determine a transmission power adjustment based on at least the signal measurement report, and wherein the spectrum use grant further indicates the transmission power adjustment.

* * * * *